US012403481B2

(12) United States Patent
Lutoslawski et al.

(10) Patent No.: US 12,403,481 B2
(45) Date of Patent: Sep. 2, 2025

(54) PULVERIZER WITH OUTPUT FLOW CONTROL AND METHODS FOR CONTROLLING OUTPUT FLOW IN A PULVERIZER

(71) Applicant: TORXX KINETIC PULVERIZER LIMITED, Hamilton (BM)

(72) Inventors: Jaroslaw Lutoslawski, Bradford (CA); Clint Aldridge, Fayette, AL (US); Christopher Mueller, King City (CA)

(73) Assignee: TORXX KINETIC PULVERIZER LIMITED, Hamilton (BM)

( * ) Notice: Subject to any disclaimer, the term of this patent is extended or adjusted under 35 U.S.C. 154(b) by 0 days.

(21) Appl. No.: 18/716,491

(22) PCT Filed: Dec. 8, 2022

(86) PCT No.: PCT/CA2022/051794
§ 371 (c)(1),
(2) Date: Jun. 4, 2024

(87) PCT Pub. No.: WO2023/102660
PCT Pub. Date: Jun. 15, 2023

(65) Prior Publication Data

US 2024/0416354 A1 Dec. 19, 2024

(30) Foreign Application Priority Data

Dec. 10, 2021 (CA) ................................ CA 3141842
Sep. 29, 2022 (CA) ................................ CA 3177678

(51) Int. Cl.
*B02C 13/28* (2006.01)
*B02C 13/18* (2006.01)

(52) U.S. Cl.
CPC .......... *B02C 13/2804* (2013.01); *B02C 13/18* (2013.01); *B02C 2013/2808* (2013.01)

(58) Field of Classification Search
CPC ................ B02C 13/28; B02C 13/2804; B02C 2013/2808; B02C 13/282; B02C 13/286;
(Continued)

(56) References Cited

U.S. PATENT DOCUMENTS 2,133,212 A * 10/1938 Schutte .................. B02C 13/28 241/197
2,440,285 A * 4/1948 Lykken .................. B02C 13/14 241/43

(Continued)

FOREIGN PATENT DOCUMENTS

CA 2147666 10/1996
WO WO 2020/010469 1/2020

OTHER PUBLICATIONS

Search Report & Written Opinion issued in PCT/CA2022/051794 (Mar. 14, 2024).

(Continued)

*Primary Examiner* — Bobby Yeonjin Kim
(74) *Attorney, Agent, or Firm* — Barnes & Thornburg LLP

(57) ABSTRACT

A pulverizer comprising: a housing having top and bottom ends, an inlet located towards the top end for receiving input material to pulverize and an outlet located towards the bottom end for discharging pulverized material from the housing, the housing including a housing sidewall defining an interior chamber and having a central housing axis: a rotatable shaft extending along the central housing axis: a plurality of rotor hub assemblies mounted to the shaft, each rotor hub assembly including a rotor hub and a plurality of rotor arms extending outwardly from the rotor for forming an airflow revolving about the central housing axis within the interior chamber, wherein at least one of the housing and of one or more of the rotor hub assemblies is selectively reconfigurable between a plurality of configurations to
(Continued)

adjust at least one parameter of an output flow of the pulverized material at the outlet.

17 Claims, 16 Drawing Sheets

(58) Field of Classification Search
CPC .......... B02C 2013/28609; B02C 13/18; B02C 13/185
See application file for complete search history.

(56) References Cited

U.S. PATENT DOCUMENTS

| | | | | |
|---|---|---|---|---|
| 3,946,952 | A * | 3/1976 | Martin | B02C 13/06 241/189.1 |
| 4,142,687 | A * | 3/1979 | Potwin | B02C 13/14 241/197 |
| 5,192,029 | A | 3/1993 | Harris | |
| 2017/0095822 | A1 * | 4/2017 | Shirai | B02C 13/18 |
| 2021/0229105 | A1 | 7/2021 | Lutoslawski | |

OTHER PUBLICATIONS

Extended Search Report in EP 22902567.1, dated Apr. 22, 2025, 11 pages.

* cited by examiner

PULVERIZER WITH OUTPUT FLOW CONTROL AND METHODS FOR CONTROLLING OUTPUT FLOW IN A PULVERIZER

CROSS-REFERENCE TO RELATED APPLICATION(S)

The present application is a U.S. nationalization under 35 U.S.C. § 371 of International Application No. PCT/CA2022/051794, filed Dec. 8, 2022, which claims the benefit of Canadian Patent Application No. 3,141,842, filed Dec. 10, 2021, and of Canadian Patent Application No. 3,177,678, filed Sep. 9, 2022, the disclosure of each of which is incorporated by reference herein in its entirety.

TECHNICAL FIELD

The technical field generally relates to pulverizers and/or vertical mills, and more specifically to pulverizers with one or more features for controlling one or more parameters of an output flow of size-reduced material discharged from the pulverizer. The technical field further pertains to methods for controlling an output flow in a pulverizer.

BACKGROUND

Pulverizing apparatuses, or "pulverizers", have been used for pulverizing, separating, aerating and/or homogenizing solid materials such as waste material. Pulverizers are sometimes used in certain industrial transformation operations to reduce the particle size of an input material such as ore or the like.

Pulverizers typically include a housing, a rotatable shaft disposed vertically in the housing and one or more rotor assemblies mounted on the rotatable shaft. Material is introduced in the housing through an inlet of the housing, is pulverized by the rotation of the shaft and rotor assemblies, and the pulverized material is discharged through an outlet of the housing. The pulverized material is usually expelled through the outlet by an output flow created by the rotation of the shaft and rotor assemblies.

For various reasons, it may be desirable or necessary to control at least one parameter of the output flow of size-reduced material (e.g. a flowrate or a shape of the output flow) as the size-reduced material is discharged from the pulverizer through an output of the pulverizer. For example, it has been observed that certain configurations of pulverizers create one or more "dead zones" in the output flow in which sized-reduced material is not properly displaced and accumulates on inner surfaces of the housing rather than being properly discharged from the outlet. In some circumstances, it may further be desirable to adjust the flowrate of the output flow based on a type of material being pulverized, or the configuration and/or specifications of a further pulverized material processing stage positioned downstream from the pulverizer, or on any other relevant parameter.

SUMMARY

According to one aspect, there is provided a pulverizer comprising: a housing having top and bottom ends, the housing further having an inlet located towards the top end for receiving input material to pulverize and an outlet located towards the bottom end for discharging pulverized material from the housing, the housing including a housing sidewall extending between the top and bottom ends and defining an interior chamber, the housing having a central housing axis; a rotatable shaft extending between the top end and the bottom end of the housing along the central housing axis; a plurality of rotor hub assemblies mounted to the shaft, each rotor hub assembly including a rotor hub and a plurality of rotor arms extending outwardly from the rotor hub towards the housing sidewall for forming an airflow revolving about the central housing axis within the interior chamber when the rotatable shaft is rotated, wherein at least one of the housing and one or more of the rotor hub assemblies is selectively reconfigurable between a plurality of configurations to adjust at least one parameter of an output flow of the pulverized material at the outlet.

In at least one embodiment, the at least one parameter includes at least one of a flowrate of the output flow and a shape of the output flow.

In at least one embodiment, the plurality of rotor assemblies includes a lower rotor assembly located proximal to the outlet, the lower rotor assembly being reconfigurable between the plurality of configurations.

In at least one embodiment, the rotor arms of the lower rotor assembly are selectively movable between a first position defining a first outer diameter of the lower rotor assembly and a second position defining a second outer diameter of the lower rotor assembly different from the first outer diameter.

In at least one embodiment, each arm includes a rotor connection element and the rotor hub of the lower hub assembly includes a plurality of arm connection elements, the rotor connection element being selectively engageable with one of the arm connection elements for attaching the arm to the rotor hub at a position corresponding to the one of the arm connecting element.

In at least one embodiment, each arm connection element includes a first plurality of fastener-receiving openings and the rotor connection element includes a second plurality of fastener-receiving openings alignable with the first plurality of fastener-receiving openings for receiving arm attachment fasteners therethrough.

In at least one embodiment, the first plurality of fastener-receiving openings includes a plurality of opening sets spaced from each other in a tangential direction and offset from each other in a radial direction.

In at least one embodiment, each opening set includes a plurality of openings aligned in a radial direction on the rotor hub.

In at least one embodiment, each opening set includes two openings.

In at least one embodiment, the rotor hub of the lower rotor assembly has a circular outer edge.

In at least one embodiment, the rotor hub of the lower rotor assembly has a non-circular outer edge.

In at least one embodiment, the rotor hub of the lower rotor assembly is sized and shaped such that the outer edge of the rotor hub is spaced from a tip of the arm by a predetermined distance, the predetermined distance being the same regardless of which opening set is engaged by the arm.

In at least one embodiment, each arm includes an arm body and a wear pad connectable to the arm body.

In at least one embodiment, the arm further includes a plurality of pad connectors disposed along the arm body at a distal end thereof for engaging the wear pad.

In at least one embodiment, each wear pad connector includes a plurality of pad fastener holes and each arm includes a plurality of corresponding arm fastener holes alignable with the pad fastener holes for receiving pad attaching fasteners therethrough.

In at least one embodiment, the wear pad is sized and shaped so as to extend outwardly along the arm up to the arm outer end.

In at least one embodiment, the wear pad is sized and shaped so as to extend outwardly along the arm beyond the arm outer end.

In at least one embodiment, the arm fastener holes include a plurality of fastener hole sets, each fastener hole set corresponding to a position of the wear pad along the arm.

In at least one embodiment, the arm is substantially spaced upwardly from a housing floor and wherein the wear pad is sized and shaped to extend downwardly from the arm and substantially to the housing floor.

In at least one embodiment, each wear pad is asymmetrical.

In at least one embodiment, each wear pad extends along a central pad axis and has upper and lower pad edges extending substantially parallel to the central pad axis, the upper pad edge being spaced from the central pad axis from a first distance and the lower pad edge being spaced from the central pad axis from a second distance greater than the first distance.

In at least one embodiment, each wear pad extends along a central pad axis and has upper and lower pad edges that are substantially linear, at least one of the upper and lower edges being angled relative to the central pad axis.

In at least one embodiment, the upper and lower edges are substantially parallel to each other.

In at least one embodiment, the wear pad is substantially parallelogram-shaped.

In at least one embodiment, the housing includes a discharge portion located at the bottom end thereof, the discharge portion including a discharge portion sidewall defining a discharge chamber portion of the interior chamber, the discharge chamber including a circular chamber portion extending substantially concentrically around the shaft and a discharge conduit extending substantially tangentially to the circular portion to discharge pulverized material from the circular portion, the discharge chamber being configured so as to provide a predetermined shape of the output flow.

In at least one embodiment, the discharge portion sidewall includes a penannular wall portion defining the circular chamber portion and a conduit portion defining the discharge conduit.

In at least one embodiment, the penannular wall portion and the conduit portion meeting at an apex extending towards the shaft, the apex being configured to provide the predetermined shape of the output flow.

In at least one embodiment, the apex is convex and curves inwardly into the interior of the discharge chamber.

In at least one embodiment, the apex includes an apex plate that is removable from the discharge portion sidewall.

In at least one embodiment, the pulverizer further comprises at least one additional apex plate sized and shaped differently from the apex plate, the at least one additional apex plate being interchangeable with the apex plate to provide another predetermined shape to the output flow.

In at least one embodiment, the pulverizer further comprises an apex extension plate connected to a sidewall of the discharge conduit and extending beyond the penannular wall portion and into the discharge chamber to form an apex of the discharge portion within the discharge chamber.

In at least one embodiment, the apex extension plate has a first plate end portion spaced from a straight portion of the discharge portion sidewall to form the discharge conduit and a second plate end portion opposite the first end portion extending beyond the penannular wall portion, the second plate end portion including an inner plate edge.

In at least one embodiment, the inner plate edge is substantially entirely straight.

In at least one embodiment, the inner plate edge includes a vertical segment and a lower angled segment extending forwardly and downwardly from the vertical segment.

In at least one embodiment, the apex extension plate is selectively movable towards and away from the rotatable shaft.

In at least one embodiment, the apex extension plate includes a plurality of plate fastening openings for receiving plate connecting fasteners, the plurality of plate fastening openings including a plurality of plate fastening opening sets, each plate fastening opening set allowing the apex extension plate to extend into the discharge chamber by a predetermined distance.

In at least one embodiment, each fastening opening set includes two fastener openings aligned substantially vertically with each other.

In at least one embodiment, the plurality of plate fastening openings sets includes at least three plate fastening openings sets.

In at least one embodiment, the plurality of plate fastening openings sets includes three plate fastening openings sets.

In at least one embodiment, the second plate end portion is substantially planar.

In at least one embodiment, the second plate end portion is substantially curved.

In at least one embodiment, the first plate end portion is substantially planar and extend in a first plate portion plane, the second plate end curving away from the first plate portion plane.

In at least one embodiment, the second plate end portion is substantially curved away from the discharge conduit.

In at least one embodiment, the second plate end portion is substantially curved towards the discharge conduit.

In at least one embodiment, the housing further includes a flow deviation plate extending away from the discharge portion sidewall and between the rotor hub assemblies and the apex to direct the output flow away from the apex.

According to another aspect, there is also provided a method for adjusting an output flow in a pulverizer, the pulverizer including a rotatable shaft with a plurality of rotor hub assemblies mounted to the shaft, each rotor hub assembly including a rotor hub and a plurality of rotor arms extending outwardly from the rotor hub, the plurality of rotor hub assemblies including a lower rotor assembly located proximal the outlet, the method comprising: adjusting an outer diameter of the lower rotor assembly.

In at least one embodiment, adjusting the outer diameter of the lower rotor assembly comprises moving the rotor arms of the lower rotor assembly relative to the rotor hub of the lower rotor assembly from a first radial position to a second radial position.

In at least one embodiment, moving the rotor arms of the lower rotor assembly comprises: disengaging connectors of the rotor arms from a first set of connectors of the rotor hub; connecting the connectors of the rotor arms to a second set of connectors of the rotor hub.

In at least one embodiment, adjusting the outer diameter of the lower rotor assembly comprises: removing a first wear pad having a first length from each rotor arm of the lower rotor assembly; and securing a second wear pad to each rotor arm of the lower rotor assembly, the second wear pad having a second length different from the first length.

In at least one embodiment, adjusting the outer diameter of the lower rotor assembly comprises: disconnecting a wear pad from a first wear pad connector on each rotor arm of the lower rotor assembly; and connecting the wear pad to a second wear pad connector located at a different position along the corresponding rotor arm of the lower rotor assembly.

According to yet another aspect, there is also provided a method for adjusting an output flow in a pulverizer, the pulverizer including a housing, a rotatable shaft received in the housing and a plurality of rotor hub assemblies mounted to the rotatable shaft, the housing including a discharge portion comprising a penannular wall portion and a conduit portion meeting at an apex extending towards the shaft, the apex includes a first apex plate removably connected to at least one of the penannular wall portion and the conduit portion, the first apex plate being shaped to provide a first output flow shape to the output flow, the method comprising: removing the first apex plate; connecting a second apex plate to at least one of the penannular wall portion and the conduit portion, the second apex plate being shaped to provide a second output flow shape different from the first output flow shape to the output flow.

According to yet another aspect, there is also provided a pulverizer comprising: a housing having an inlet for receiving input material to pulverize and an outlet for discharging pulverized material from the housing; a rotor assembly disposed within the housing for pulverizing the input material and for creating an output flow to expel the pulverized material through the outlet; wherein at least one of the housing and the rotor assembly is reconfigurable to adjust at least one parameter of the output flow at the outlet.

According to yet another aspect, there is also provided a rotor assembly for a pulverizer, the rotor assembly comprising: a rotor hub; and a plurality of rotor arms extending outwardly from the rotor hub, the rotor arms being selectively movable between a first position defining a first outer diameter of the rotor assembly and a second position defining a second outer diameter of the rotor assembly different from the first outer diameter.

In at least one embodiment, each arm includes a rotor connection element and the rotor hub of the lower hub assembly includes a plurality of arm connection elements, the rotor connection element being selectively engageable with one of the arm connection elements for attaching the arm to the rotor hub at a position corresponding to the one of the arm connecting element.

In at least one embodiment, each arm connection element includes a first plurality of fastener-receiving openings and the rotor connection element includes a second plurality of fastener-receiving openings alignable with the first plurality of fastener-receiving openings for receiving arm attachment fasteners therethrough.

In at least one embodiment, the first plurality of fastener-receiving openings includes a plurality of opening sets spaced from each other in a tangential direction and offset from each other in a radial direction.

In at least one embodiment, each opening set includes a plurality of openings aligned in a radial direction on the rotor hub.

In at least one embodiment, each opening set includes two openings.

In at least one embodiment, the rotor hub of the lower rotor assembly has a circular outer edge.

In at least one embodiment, the rotor hub of the lower rotor assembly has a non-circular outer edge.

In at least one embodiment, the rotor hub of the lower rotor assembly is sized and shaped such that the outer edge of the rotor hub is spaced from a tip of the arm by a predetermined distance, the predetermined distance being the same regardless of which opening set is engaged by the arm.

In at least one embodiment, each arm includes an arm body and a wear pad connectable to the arm body.

In at least one embodiment, the arm further includes a plurality of pad connectors disposed along the arm body at a distal end thereof for engaging the wear pad.

In at least one embodiment, each wear pad connector includes a plurality of pad fastener holes and each arm includes a plurality of corresponding arm fastener holes alignable with the pad fastener holes for receiving pad attaching fasteners therethrough.

In at least one embodiment, the wear pad is sized and shaped so as to extend outwardly along the arm up to the arm outer end.

In at least one embodiment, the wear pad is sized and shaped so as to extend outwardly along the arm beyond the arm outer end.

In at least one embodiment, the arm fastener holes include a plurality of fastener hole sets, each fastener hole set corresponding to a position of the wear pad along the arm.

In at least one embodiment, the arm is substantially spaced upwardly from a housing floor and wherein the wear pad is sized and shaped to extend downwardly from the arm and substantially to the housing floor.

In at least one embodiment, each wear pad is asymmetrical.

In at least one embodiment, each wear pad extends along a central pad axis and has upper and lower pad edges extending substantially parallel to the central pad axis, the upper pad edge being spaced from the central pad axis from a first distance and the lower pad edge being spaced from the central pad axis from a second distance greater than the first distance.

In at least one embodiment, each wear pad extends along a central pad axis and has upper and lower pad edges that are substantially linear, at least one of the upper and lower edges being angled relative to the central pad axis.

In at least one embodiment, the upper and lower edges are substantially parallel to each other.

In at least one embodiment, the wear pad is substantially parallelogram-shaped.

DETAILED DESCRIPTION

Figure 1:
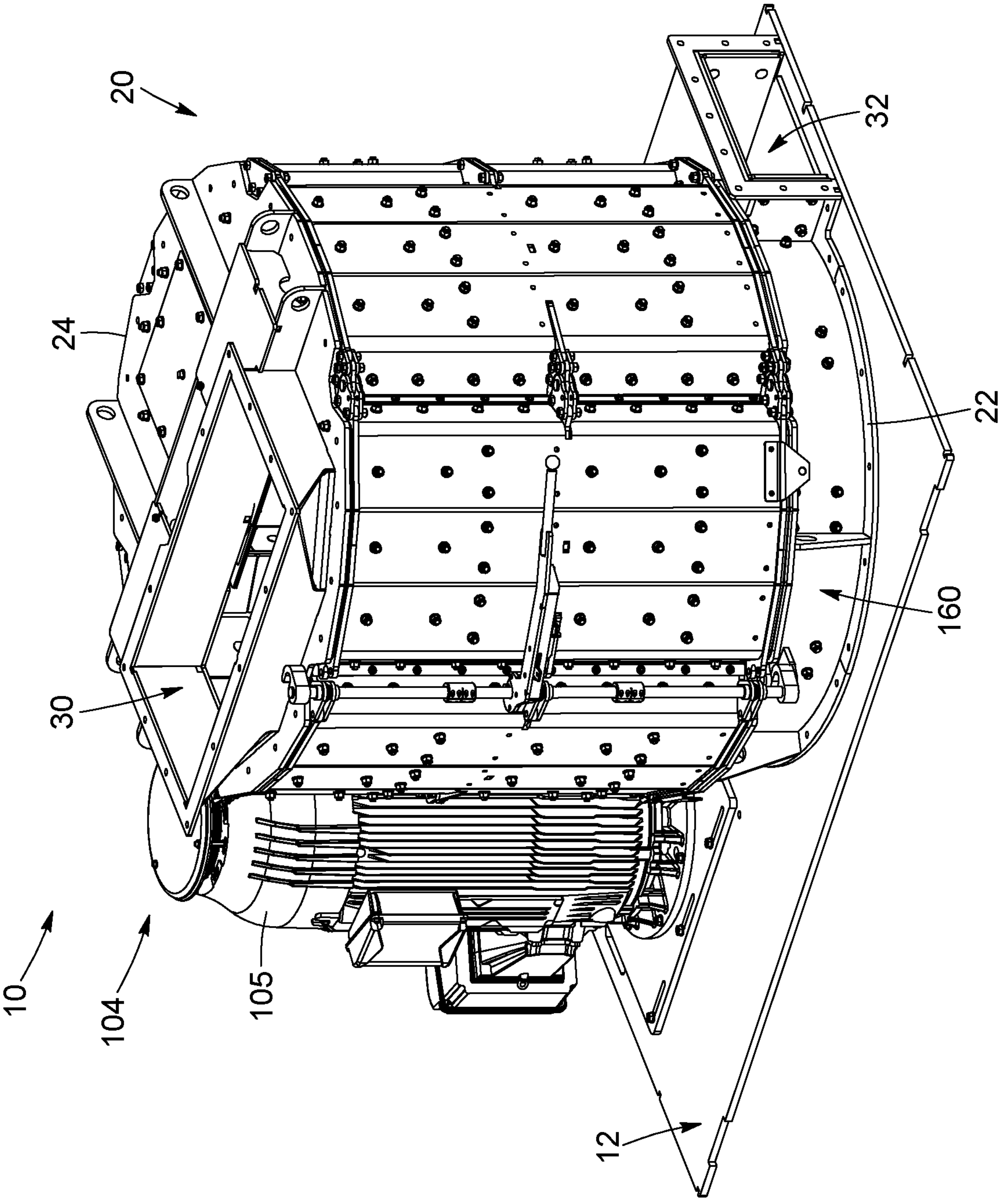
FIG. 1 is a perspective view of a pulverizer, in accordance with one embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

For the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as “above”, “below”, “top”, “bottom”, “forward”, “rearward” “left”, “right” and the like should, unless otherwise indicated, be taken in the context of the figures and correspond to the position and orientation in the pulverizer and corresponding parts when being used. Positional descriptions should not be considered limiting.

Referring now to FIGS. 1 to 4, there is shown a pulverizer 10, in accordance with one embodiment. The pulverizer 10 is adapted to receive an input material and to pulverize or comminute the input material.

It will be understood that the terms “pulverize”, “pulverization”, “comminute” and “comminution” are used herein to refer to a reduction in size of the particles in the input material.

The input material could be completely solid or at least partially solid. Specifically, the input material could include waste, glass, compost, plastic film, rocks, ore, minerals, cement, ceramics, metal pieces or any other material which may be pulverizable.

Figure 4:
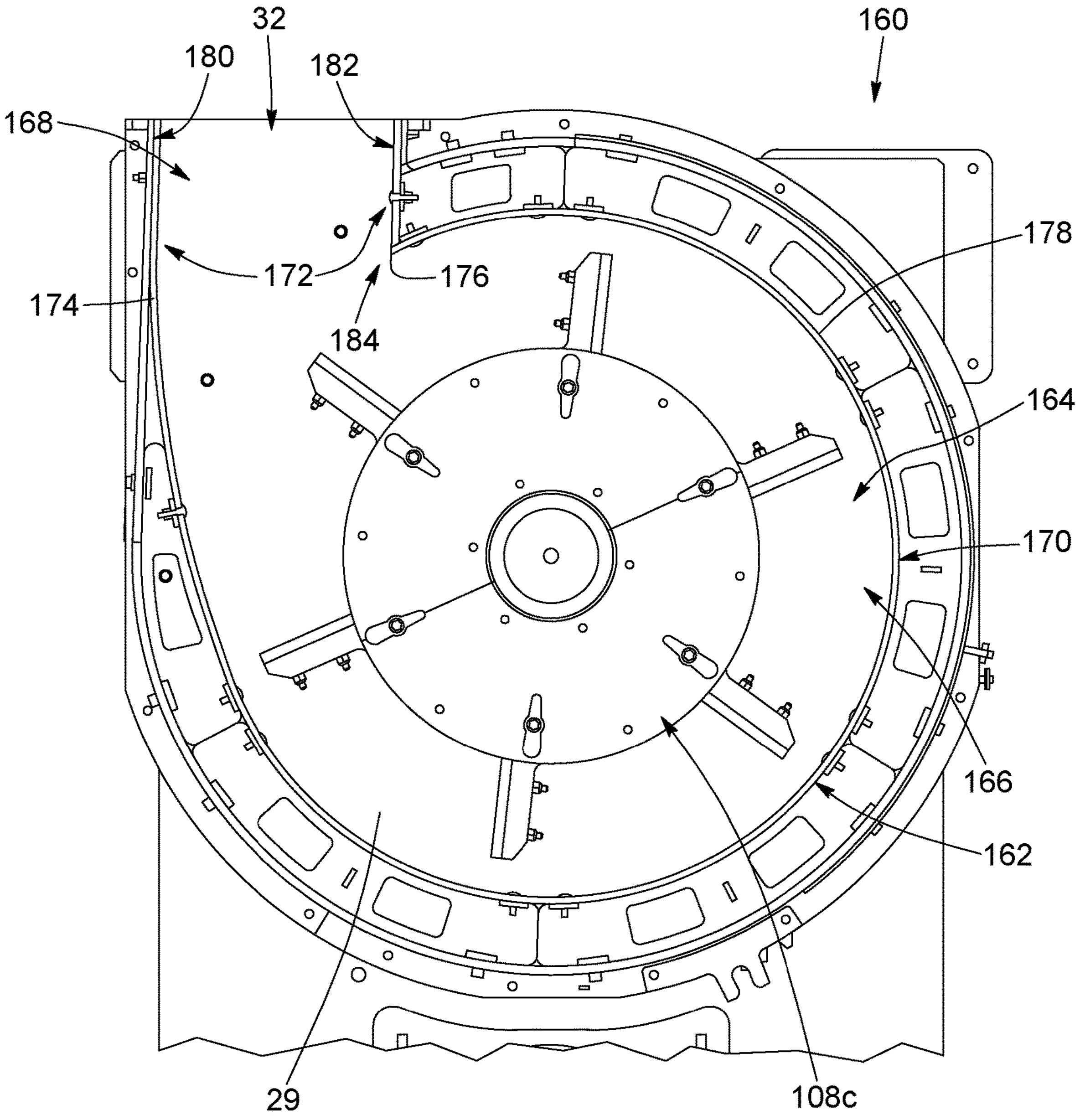
FIG. 4 is a transversal cross-section view of the pulverizer illustrated in FIG. 1, showing a lower rotor of the rotor assembly in a discharge portion of the pulverizer's housing.

In the illustrated embodiment, the pulverizer 10 includes a base 12 and a housing 20 mounted over the base 12. Specifically, the housing 20 includes a bottom end 22 connected to the base 12 and a top end 24 opposite the bottom end 22. The housing 20 is hollow and includes a housing sidewall 26 extending between the top and bottom ends 24, 22 to define an interior chamber 28 in which the pulverization occurs, as well as a housing floor 29, shown in FIG. 4, located at the bottom end 22. Specifically, the housing 20 includes an inlet 30 located at the top end 24 to receive the input material and an outlet 32 located at the bottom end 22 through which the pulverized material may be discharged once having been pulverized in the interior chamber 28. In the illustrated embodiment, the outlet 32 allows pulverized material to be discharged in a substantially tangential direction to the housing sidewall 26, as best shown in FIG. 4. Still in the illustrated embodiment, the housing sidewall 26 extends all the way to the bottom end 22 of the housing 20 and the outlet 32 is defined in the housing sidewall 26. Alternatively, the housing 20 could instead include a discharge piece that is distinct from the housing sidewall 26 and is secured to the housing sidewall 26, and the outlet 32 could be defined in the discharge piece.

Figure 2:
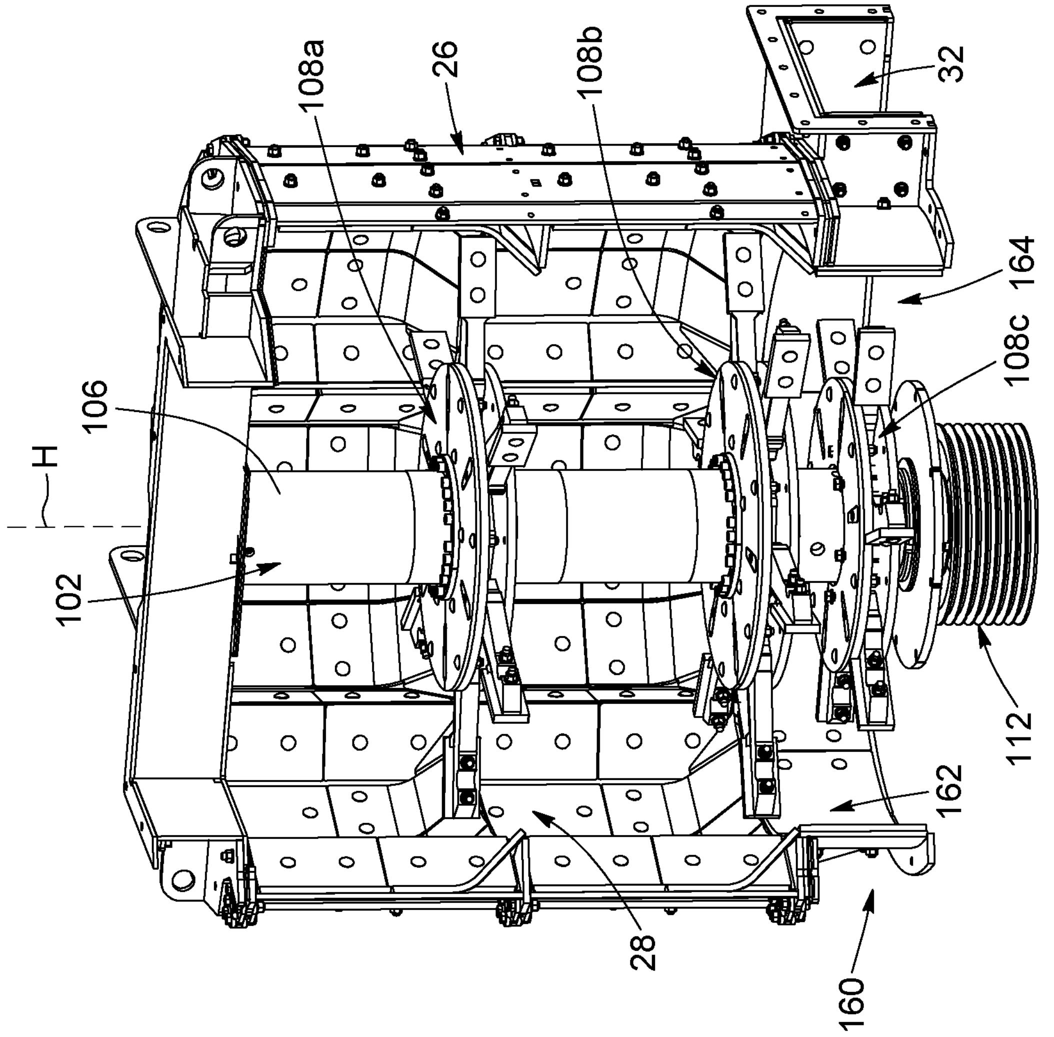
FIG. 2 is a cross-section view of the pulverizer illustrated in FIG. 1.

As shown in FIG. 2, in the illustrated embodiment, the housing 20 is generally cylindrical and defines a central housing axis H which extends between the top and bottom ends 24, 22 of the housing 20 and substantially perpendicular to the housing floor 29. The housing 20 is adapted to be disposed such that the central housing axis H extends substantially vertically when the pulverizer 10 is in operation. In this configuration, the input material fed into the inlet 30 will ultimately tend to fall down towards the outlet 32 by gravity.

In the illustrated embodiment, the pulverizer 10 further comprises a rotor assembly 102 disposed within the interior chamber 28 and a rotary actuator 104 operatively coupled to the rotor assembly 102 for rotating the rotor assembly 102 in order to generate an airflow within the housing 20. Specifically, the rotor assembly 102 includes a rotatable shaft 106 located in the interior chamber 28 and extending between the top and bottom ends 24, 22 of the housing 20, along the central housing axis H, and a plurality of pulverizing rotor assemblies 108*a*, 108*b*, 108*c* secured to the rotatable shaft 106 so as to rotate about the central housing axis H when the rotatable shaft 106 is rotated. In the illustrated embodiment, the pulverizing rotor assemblies 108*a*, 108*b*, 108*c* include a lower rotor assembly 108*c* located towards the bottom end 22 of the housing 20, proximal the outlet 32, and two upper rotor assemblies 108*a*, 108*b* spaced from each other and located above the lower rotor assembly 108*c*.

Each pulverizing rotor assembly 108*a*, 108*b*, 108*c* includes a rotor hub 120 and a plurality of rotor arms 122 extending outwardly from the rotor hub 120 and towards the housing sidewall 26. Each rotor arm 122 is elongated and extends between an inner arm end located towards the rotor hub 120 and an outer arm end or arm tip 150 extending away from the rotor hub 120. The rotatable shaft 106 extends through the rotor hub 120 such that the rotor arms 122 are disposed in an arm rotation plane which extends orthogonally through the central housing axis H. In this configuration, when the rotatable shaft 106 is rotated, the rotor arms 122 therefore remain in the arm rotation plane and move along the arm rotation plane. Alternatively, instead of all being disposed in a rotation plane, the rotor arms 122 could instead be angled upwardly or downwardly relative to the rotatable shaft 106. In yet another embodiment, the rotor arms 122 could instead be pivotably connected to the rotatable shaft 106 such that the rotor arms 122 could selectively be angled upwardly and downwardly as desired, either manually or automatically using one or more arm actuators.

The housing 20 further includes a discharge portion 160, located at its bottom end 22, in which is defined the outlet 32. The discharge portion 160 has a discharge portion sidewall 162 which defines a discharge chamber portion 164 corresponding to a bottom portion of the housing's interior chamber 28. The discharge chamber portion 164 includes a circular chamber portion 166 defined around the shaft 106 and a discharge conduit 168 which extends substantially tangentially to the circular chamber portion 166 and at the end of which the outlet 32 is defined. In the illustrated embodiment, the lower rotor assembly 108*c* is disposed in the discharge chamber portion 164, and the rotation of the shaft 106 causes the lower rotor assembly 108*c* to rotate which creates an output flow extending generally circularly around the shaft 106 and out of the discharge portion 160 through the discharge conduit 168.

For various reasons, it may be desirable to control the output flow of size-reduced material discharged from the pulverizer 10. For example, it may be desirable to adjust a flowrate of the output flow according to a configuration of the vessel, receptacle, conduit or transportation device (such as a conveyor or the like) in or on which the size-reduced material is to be discharged, or according to a type of input material being pulverized or to any characteristic of the input material being pulverized. In some circumstances, it has also been observed that the output flow towards the bottom end of the housing and/or in the discharge conduit may adopt a shape which causes size-reduced material to stick to the sidewall of the housing and to accumulate thereon instead of being discharged from the housing. It may therefore be desirable or necessary to modify at least one parameter of flowrate and/or shape of the output flow.

Rotor Outer Diameter Adjustment

Figure 5:
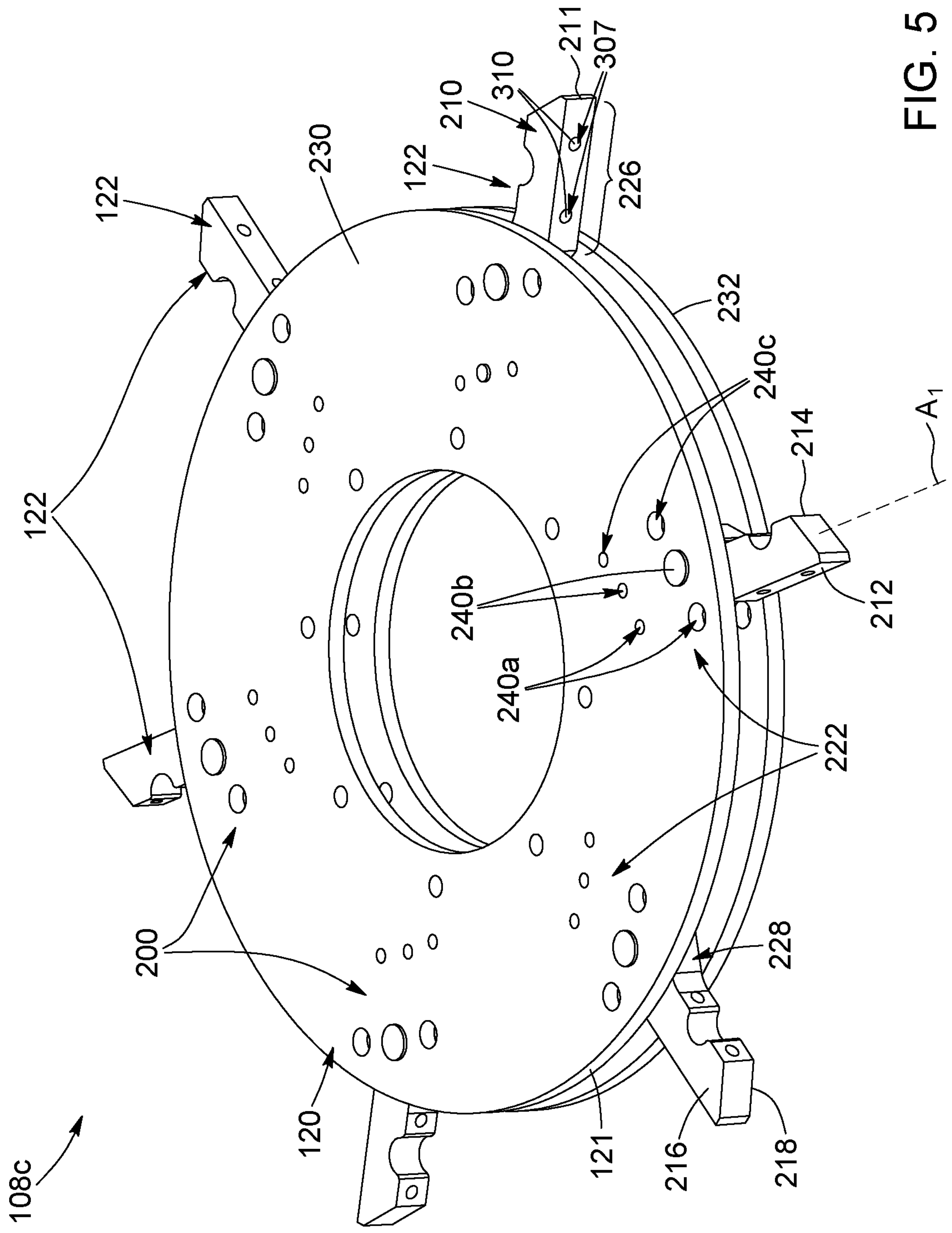
FIG. 5 is a perspective view of a lower rotor assembly for the pulverizer illustrated in FIG. 1, in accordance with one embodiment.

Turning to FIG. 5, there is shown the lower rotor assembly 108*c* for the pulverizer 10, in accordance with one embodiment.

In this embodiment, the lower rotor assembly 108*c* is configured such that an outer diameter of the lower rotor assembly 108*c* can be increased in order to increase the flowrate of the output flow or decreased in order to decrease the flowrate of the output flow.

Specifically, the outer diameter of the lower rotor assembly 108*c* corresponds to a diameter of a circle extending through the arm tips 150 of the rotor arms 122 of the lower rotor assembly 108*c*. In this embodiment, to adjust the outer diameter of the lower rotor assembly 108*c*, the arms 122 may be reconfigured such that the arm tips 150 may be moved towards or away from the shaft 106 to thereby respectively decrease or increase the rotor outer diameter. In the illustrated embodiment, this may be accomplished by moving the entire rotor arms 122 closer to or further away from the shaft 106. More specifically, the rotor hub 120 of the lower rotor assembly 108*c* includes a plurality of hub connectors 200 and each arm 122 of the lower rotor assembly 108*c* includes an arm connector 202 (best shown in FIG. 7) which is selectively engageable with one of the hub connectors 200 to position the rotor arm 122 at a radial position corresponding to a radial position of the hub connector 200 on the rotor hub 120.

In the illustrated embodiment, each rotor arm 122 includes an arm body 210 and each arm connector 202 includes a plurality of fastener-receiving openings 220 defined in the arm body 210. Each hub connector 200 further includes a corresponding plurality of fastener-receiving openings 222 which are positioned so as to be alignable with the fastener-receiving openings 220 of the rotor arms 122. The rotor arms 122 can then be secured to the rotor hub 120 using fasteners extending through aligned openings of the rotor arms 122 and the rotor hub 120. When connected to the rotor hub 120, each rotor arm 122 overlaps the rotor hub 120 and includes an outer arm portion 226 that extends outwardly beyond an outer edge 121 of the rotor hub 120 and an inner arm portion 228 which extends along the rotor hub 120 and inwardly of the outer edge 121 of the rotor hub 120, towards the shaft 106.

In the illustrated embodiment, the rotor hub 120 of the lower rotor assembly 108*c* includes an upper hub plate 230 and a lower hub plate 232, and the rotor arms 122 are substantially sandwiched between the upper and lower hub plates 230, 232. In this embodiment, the fastener-receiving openings 222 of the rotor hub 120 include fastener-openings which face each other such that the rotor arms 122 may be sandwiched between the upper and lower hub plates 230, 232, with the fastener-receiving openings 220 of the rotor arms 122 aligned with the fastener-receiving openings in both the hub plates 230, 232. In this position, arm securing fasteners can be inserted through the upper hub plate 230, through the rotor arm 122 and through the lower hub plate 232 to secure the rotor arm 122 to the rotor hub 120. Alternatively, the rotor hub 120 may be configured differently. For example, the rotor hub 120 may not include two hub plates, but could instead includes a single hub body to which the rotor arms 122 could be attached. Various other hub configurations may also be considered.

As shown in FIG. 5, the fastener-receiving openings 222 defined in the rotor hub 120 include a plurality of opening sets 240*a*, 240*b*, 240*c*, each opening set including a number of openings corresponding to the number of fastener-receiving openings 220 in each rotor arm 122. Each opening set corresponds to a certain position of the rotor arms 122 relative to the shaft 106 and to a certain outer diameter of the lower rotor assembly 108*c*. During operation of the pulverizer 10, each rotor arm 122 is connected to the rotor hub 120 via one of the opening sets 240*a*, 240*b*, 240*c* which provides the lower rotor assembly 108*c* with a desired outer diameter. Specifically, all the rotor arms 122 are connected to a same one of the opening sets 240*a*, 240*b*, 240*c* in their corresponding plurality of fastener-receiving openings. For example, the rotor arms 122 may all be connected to rotor hub 120 via the first opening set 240*a* of their corresponding plurality of fastener-receiving openings.

To adjust the rotor outer diameter and therefore the flowrate of the outflow, the rotor arms 120 may be disengaged from the opening set 240*a*, 240*b* or 240*c* through which they are connected to the rotor hub 102 and re-connected to the rotor hub 120 via a different opening set 240*a*, 240*b* or 240*c* which provides the lower rotor assembly 108*c* with the desired outer diameter creating a desired flowrate of the outflow when the lower rotor assembly 108*c* is rotated. For example, the rotor arms 122 connected to the first opening set 240*a* could be disconnected from the first opening set 240*a* and be connected to the second or third opening sets 240*b* or 240*c*, which are closer to the shaft 106 and therefore will reduce the outer diameter of the lower rotor assembly 108*c*, thereby also reducing the flowrate of the output flow.

In the illustrated embodiment, removing the rotor arms 122 may include removing the fastening pins and removing the upper hub plate 230 to free the rotor arms 122 from the rotor hub 120. In other embodiments, the lower rotor assembly 108*c* could instead include an arm repositioning mechanism which could allow the rotor arms 122 to be repositioned to adjust the outer diameter of the lower rotor assembly 108*c* without having to completely remove the fastening pins and/or the upper or lower hub plate. For example, the fastening pins could engage guide slots defined in the hub plates 230, 232 and the rotor arms 122 could be slidable between the different radial positions corresponding to the opening sets 240*a*, 240*b*, 240*c*. Alternatively, the arm and hub connectors 200, 202 could include other types of connectors instead of fastener-receiving openings and fastening pins.

In the illustrated embodiment, the fastener-receiving openings 220 of the rotor arms 122 include two fastener-receiving openings which are spaced apart from each other substantially in a radial direction of the rotor hub 120 to receive two fastening pins. Similarly, each opening set of the rotor hub 120 also includes two corresponding fastener-receiving openings spaced apart from each other substantially in the radial direction. The fastening pins thereby create two fixation points of the arms to the rotor hub 120 to prevent the rotor arm 122 from pivoting or rotating relative to the rotor hub 120. In some embodiments, one of the two fastening pins could be configured as a mechanical fuse and be breakable when the arm is subjected to a force in a substantially tangential direction which is above a certain threshold. This would allow the rotor arm 122 to pivot about the remaining, unbroken fastening pin to prevent damage to the rotor arm 122 itself or to the interior of the housing. Alternatively, the two fastening pins may not include a breakable pin.

It will be understood that the term "fastening pin" used hereinabove may refer to any type of elongated fastener that a skilled person would consider suitable, which could be externally threaded or be devoid of any threads, could have a circular, square, triangular cross-section or any other suitable cross-section shape, could have a constant diameter along its length or may have a varying diameter, and/or have any other suitable features.

In the illustrated embodiment, the fastener-receiving openings of the rotor hub 120 include first, second and third opening sets 240*a*, 240*b*, 240*c* which are spaced from each other in a tangential direction and offset relative to each other in a radial direction. Specifically, the opening sets 240*a*, 240*b*, 240*c* are positioned such that the opening sets 240*a*, 240*b*, 240*c* are positioned progressively closer to the shaft 106 when moving in a counterclockwise direction around the rotor hub 120. Alternatively, the opening sets 240*a*, 240*b*, 240*c* could be positioned such that the opening sets 240*a*, 240*b*, 240*c* are progressively closer to the shaft 106 when moving in a clockwise direction around the rotor hub 120 instead, or even be positioned on the hub according to an entirely different configuration.

It will be understood that if the opening sets 240*a*, 240*b*, 240*c* were all aligned along a single radius of the rotor hub 120, creating the openings may necessitate the removal of a relatively large amount of material from the rotor hub 120 along this radius which may undesirably weaken the rotor hub 120 along this radius. The present configuration in which the opening sets 240*a*, 240*b*, 240*c* are spaced from each other in the tangential direction substantially eliminates this drawback. Nevertheless, in another embodiment, more than one opening set or all opening sets could be aligned with each other along a radius of the rotor hub 120.

Figure 3:
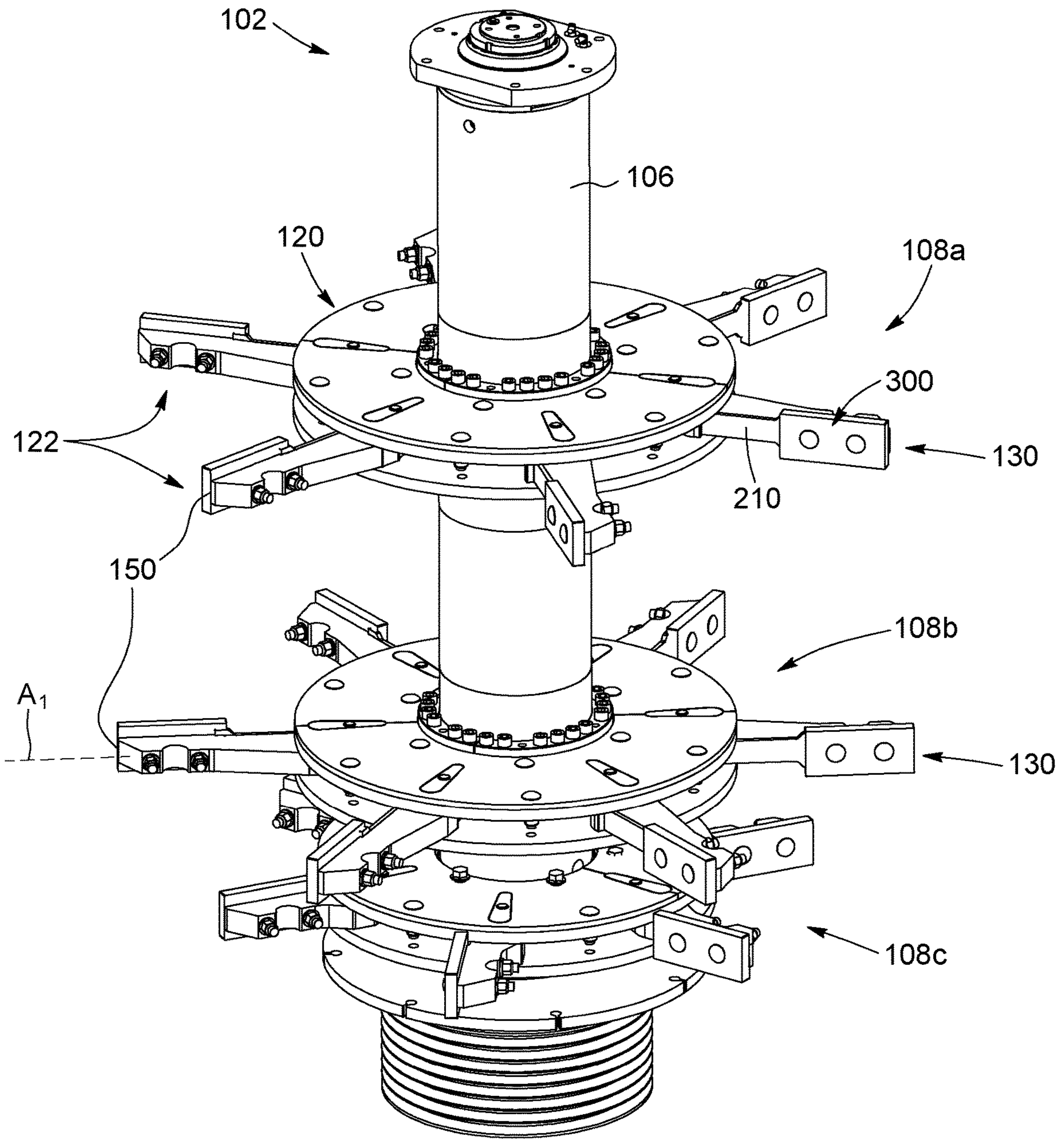
FIG. 3 is a perspective view of a rotor assembly for the pulverizer illustrated in FIG. 1, shown in isolation.

In the illustrated embodiment, each arm 122 further includes a wear pad 300, best shown in FIG. 3, connectable to the arm body 210. Specifically, the wear pad 300 is sized and shaped to cover at least a portion of the arm body 210 to protect the arm body 210 from impact of materials fed into the pulverizer 10 during rotation of the rotor arms 122. The wear pad 300 is therefore positioned on the arm body 210 so as to face forwardly during rotation of the rotor arm 122. More specifically, similarly to a helicopter rotor blade which has a leading edge and a trailing edge, the arm body 210 has a leading side 212 and a trailing side 214, and the wear pad 300 is positioned on the leading side 212. In other embodiments, the lower rotor's rotation direction could be reversible and each rotor arm 122 could include wear pads on both sides of the arm body 210.

In one embodiment, the wear pad 300 is sized and shaped to completely cover the outer arm portion 226 of the rotor arm 122. Specifically, the wear pad 300 extends towards the center of the rotor hub 120 at least up to the outer edge 121 of the rotor hub 120 such that it extends substantially along the entire length of the outer arm portion 226.

In the embodiment illustrated in FIG. 5, the outer edge 121 of the rotor hub 120 is substantially circular. It will be understood that since the opening sets 240*a*, 240*b*, 240*c* are positioned progressively closer to the shaft 106, when the rotor arms 122 are moved from one of the opening sets 240*a*, 240*b*, 240*c* to another one of the opening sets 240*a*, 240*b*, 240*c*, the length of the outer arm portion 226 (i.e. the distance between the arm tip 150 and the outer edge 121 of the rotor hub 120), is modified accordingly. For example, moving the rotor arms 122 from attachment via the first opening set 240*a* to attachment via the second opening set 240*b* will reduce the length of the outer arm portion 226. In this embodiment, to allow the outer arm portion 226 on the leading side 212 to remain substantially entirely covered when the rotor arm 122 is moved from the first radial position to the second radial position—or to avoid interference between the wear pad 300 and the rotor hub 120 if the outer arm portion 226 is shorter in the second radial position, the wear pad 300 could be removed and replaced with another wear pad having a different length corresponding to the length of the outer arm portion 226 in the second radial position. In this embodiment, the lower rotor assembly 108*c* could therefore be provided with a plurality of wear pads, each wear pad having a length corresponding to a length of the outer arm portion 226 of the arms 122 when the arms 122 are in a corresponding radial position. Alternatively, the wear pad 300 may not cover the entire length of the outer arm portion 226.

In another embodiment, instead of the arms 122 including a single set of fastener-receiving openings and the rotor hub 120 including multiple sets of fastener-receiving openings, the rotor hub 120 could instead include a single set of fastener-receiving openings for each arm 122 and each arm 122 could include multiple set of fastener-receiving openings with each fastener-receiving opening corresponding to a certain radial position of the arm 122 relative to the rotor hub 120. In yet another embodiment, both the arms 122 and the rotor hub 120 could include multiple sets of fastener-receiving openings.

Figure 6:
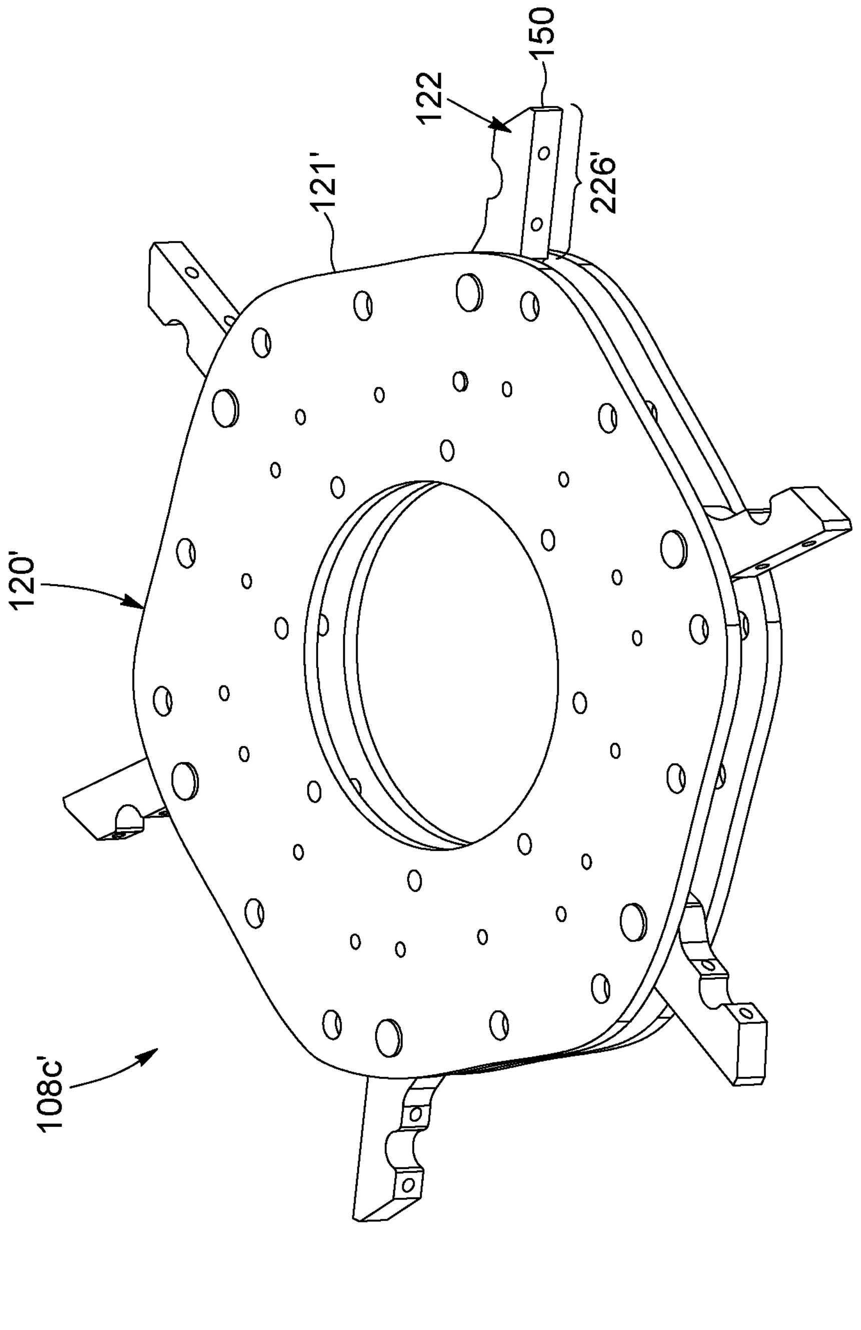
FIG. 6 is a perspective view of a lower rotor assembly for the pulverizer illustrated in FIG. 1, in accordance with another embodiment.

FIG. 6 shows another embodiment of a lower rotor assembly 108*c*' comprising a rotor hub 120' having an outer edge 121' and a plurality of the rotor arms 122 connected to the rotor hub 120' such that an outer arm portion 226' of the rotor arms 122 extend outwardly beyond the outer edge 121' of the rotor hub 120'. In this embodiment, the outer edge 121' of the rotor hub 120' is not circular. Instead, the rotor hub 120' is sized and shaped to allow the distance between the arm tips 150 and the outer edge 121' of the rotor hub 120' to remain constant when the rotor arm 122 is moved from one radial position to another radial position. In other words, the length of the outer arm portion 226' is the same at every radial position of the arms 122. This configuration eliminates the need to provide multiple wear pads having different lengths to allow the outer arm portion 226' to remain substantially entirely covered when the arms 122 are moved from one position to another position.

Figure 8:
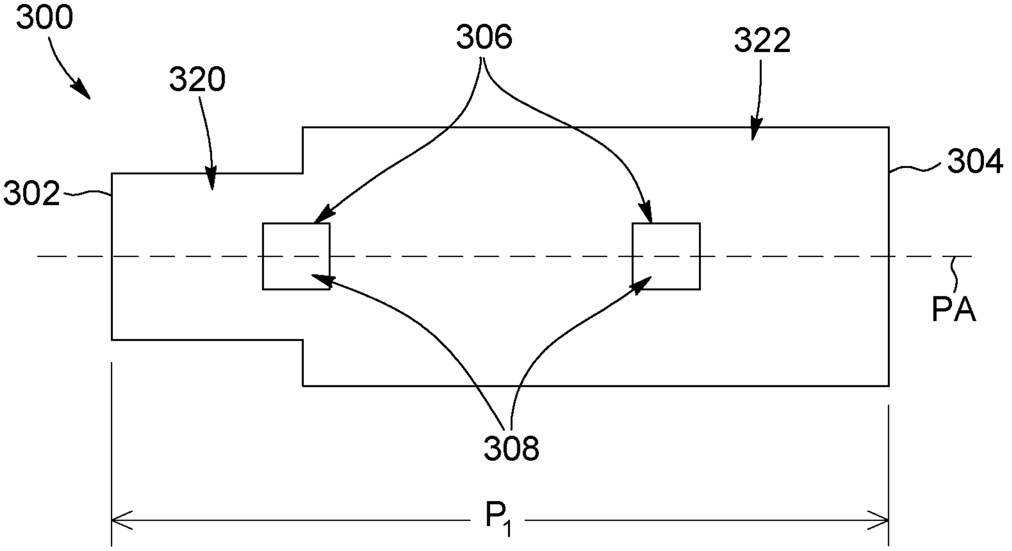
FIG. 8 is a front elevation view of a wear pad for a rotor arm of the lower rotor illustrated in FIG. 5, in accordance with one embodiment.

Referring now to FIGS. 5 and 8, each wear pad 300 is substantially elongated and extends between an inner pad end 302 and an outer pad end 304. In the illustrated embodiment, each wear pad 300 further includes an arm connector 306 for connecting the wear pad 300 to a corresponding pad connector 307 of the rotor arm 122. More specifically, the arm connector 306 includes a pair of fastener-receiving openings 308 and the pad connector 307 includes a pair of corresponding pair of fastener-receiving openings 310 which are spaced from each other similarly to the fastener-receiving openings 308 of the wear pad 300 to allow the wear pad 300 to be connected to the rotor arm 122 using a pair of fasteners.

In one embodiment, the wear pad 300 further extends up to an outer end 211 of the arm body 210. In other words, the wear pad does not extend beyond the outer end 211 of the arm body 210. In this embodiment, the wear pad 300 therefore has a length, corresponding to a distance between the inner and outer pad ends 302, 304, which is substantially equal to the length of the outer arm portion 226.

In some embodiments, the wear pad 300 could instead extend beyond the outer end 211 of the arm body 210 to further increase a surface area of the rotor arm 122 on the leading side 212. In this embodiment, the arm tip 150 would therefore correspond to the outer pad end 304 instead of the outer end 211 of the arm body 210.

Figure 9:
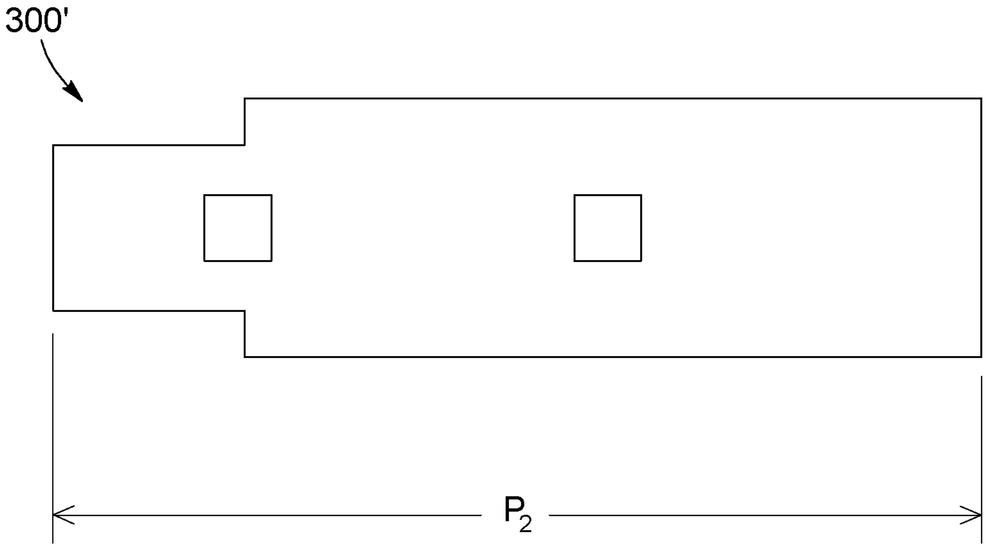
FIG. 9 is a front elevation view of a wear pad for a rotor arm of the lower rotor illustrated in FIG. 5, in accordance with another embodiment.

In one embodiment, the pulverizer 10 may be provided with a plurality of interchangeable wear pads with different lengths. For example, the plurality of interchangeable wear pads could include a first wear pad 300 having a first pad length $P_1$, as shown in FIG. 8 and a second wear pad 300' having a second pad length $P_2$ greater than the first pad length $P_1$, as shown in FIG. 9. In this embodiment, the first pad length $P_1$ could be substantially equal to the length of the outer arm portion 226 such that the first wear pad 300 does not extend beyond the outer end 211 of the arm body 210 and the second pad length $P_2$ could be greater than the length of the outer arm portion 226 such that the second wear pad 300' extends beyond the outer end 211 of the arm body 210. Alternatively, both the first and second pad lengths $P_1$, $P_2$ could be greater than the length of the outer arm portion 226 such that both the first and second wear pads 300, 300' would extend beyond the outer end 211 of the arm body 210.

It will be understood that since in this embodiment, the arm tips 150, which define the outer diameter of the lower rotor assembly 108*c*, correspond to the outer pad end 304 of the wear pad 300, replacing the wear pad 300 on each rotor arm 122 with a longer wear pad will increase the outer diameter of the lower rotor assembly 108*c*. In this embodiment, instead of moving the rotor arms 122 to a different radial position to modify the outer diameter of the lower rotor assembly 108*c*, the wear pad 300 on each rotor arm 122 could simply be replaced with another wear pad, such as the second wear pad 300' illustrated in FIG. 9, which has a different length. In some embodiments, the outer diameter of the lower rotor assembly 108*c* could be adjusted by a combination of both moving the rotor arm 122 to a different radial position and by replacing the wear pad with another wear pad having a different length.

Figure 7:
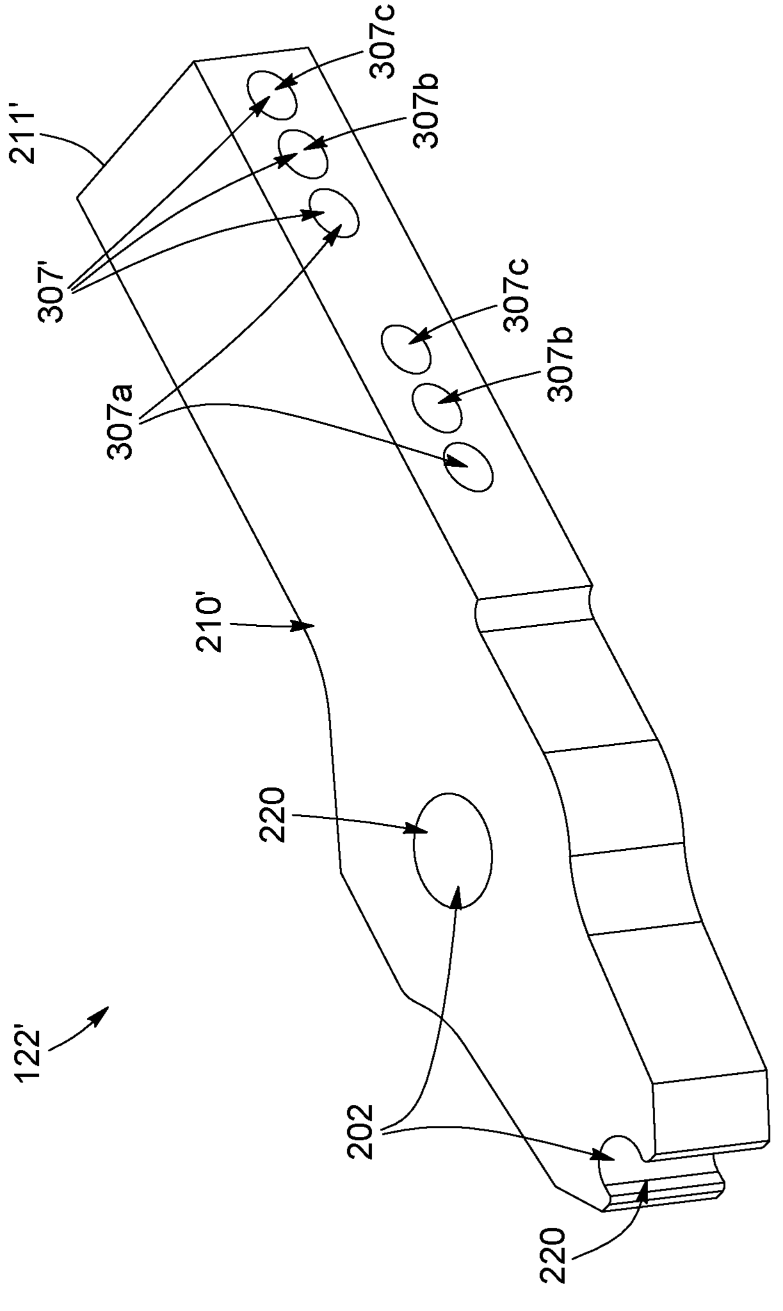
FIG. 7 is a perspective view of a rotor arm for a lower rotor assembly of the pulverizer illustrated in FIG. 1, in accordance with another embodiment.

Turning to FIG. 7, there is shown a rotor arm 122', in accordance with another embodiment. In this embodiment, the rotor arm 122' includes an arm body 210' having an outer end 211' and a plurality of pad connectors 307', each pad connector 307' corresponding to a different position of the wear pad 300 along the arm 122'. Specifically, in the illustrated embodiment, the plurality of pad connectors 307' comprises first, second and third pad connectors 307*a*, 307*b*, 307*c*. The pad connectors 307' are substantially aligned with each other along a longitudinal arm axis A1 of the arm 122 and each pad connector including a pair of fastener-receiving openings. Alternatively, the arm body 210' could include more or less than three pad connectors.

In this embodiment, instead of replacing the wear pad 300 with another wear pad having a different length, the wear pad 300 could simply be connected to the arm body 210' using another one of the pad connectors 307'. For example, by moving the wear pad 300 from the first pad connector 307*a* to the second pad connector 307*b* located further towards the outer end 211' of the arm body 210', the outer pad end 304 moves further away from the hub 120, thereby increasing the outer diameter of the lower rotor assembly 108*c*. Conversely, by moving the wear pad 300 from the second pad connector 307*b* to the first pad connector 307*a* would move the outer pad end 304 towards the hub 120 and thereby reduce the outer diameter of the lower rotor assembly 108*c*.

In another embodiment, instead of the arm 122 comprising multiple pad connectors 307', the arm 122 could include a single pad connector by the wear pad 300 could include multiple arm connectors 306 spaced from each other along a longitudinal pad axis PA of the wear pad 300 and which could be selectively connected to the pad connector to secure the wear pad 300 to the arm 122 at a desired radial position. In yet another embodiment, the outer diameter of the lower rotor assembly 108*c* could be adjusted both by replacing the wear pad 300 by another wear pad having a different length and by connecting the other wear pad at a different position along the arm body 210'.

In other embodiments, the arms 122 could be configured differently such that moving the arm tips 150 towards and away from the shaft 106 does not involve moving the entire arms 122. For example, in one embodiment, the arms 122 could be telescopic such that the arm tips 150 can be moved relative to an inner end of the arm.

In yet another embodiment, instead of only the lower rotor assembly 108*c* being adjustable, one or more of the other rotor assemblies 108*a*, 108*b* could also be configured according to one or more of the above-described configurations to allow its diameter to be adjusted.

Wear Pad Geometry

It will be understood that the wear pads 300, being placed on the leading side 212 of the arm body 210, may contribute to the generation of the output flow, and could further have a geometry selected to provide an output flow having one or more desired characteristics.

For example, in the embodiment illustrated in FIGS. 8 and 9, the wear pads 300 are further configured so as to contribute to the generation of airflow within the pulverizer 10. More specifically, the wear pad 300 may extend at least partially upwardly beyond a top side 216 of the arm body 210 and/or downwardly beyond a bottom side 218 of the arm body 210 to increase the surface area of the rotor arm 122 on the leading side 212. In the embodiment illustrated in FIG. 8, the wear pad 300 includes an inner pad portion 320 located towards the inner pad end 302 which has a height corresponding substantially to a height of the arm body 210, and an outer pad portion 322 located towards the outer pad end 304 which has a height greater than the height of the inner pad portion 320, and therefore greater than the height of the arm body 210. More specifically, in the illustrated embodiment, the outer pad portion 322 extends both upwardly beyond the top side 216 and downwardly beyond the bottom side 218 of the arm body 210. Alternatively, the outer pad portion 322 could instead only upwardly beyond the top side 216 or only downwardly beyond the bottom side 218.

In one embodiment, the wear pad 300 may be sized and shaped to extend only along the outer arm portion 226 of the arm body 210, which extends outwardly beyond the outer edge 121 of the rotor hub 120. In this embodiment, the inner pad end 302 is generally aligned with the outer edge 121 of the rotor hub 120.

Alternatively, the wear pad 300 may be sized and shaped to extend along the outer arm portion 226 and partially on the inner arm portion 228 of the arm body 210. For example, the wear pad 300 may be sized and shaped such that the outer pad portion 322 extends along the outer arm portion 226 and the inner pad portion 320 extends along a portion of the inner arm portion 228.

Figure 10:
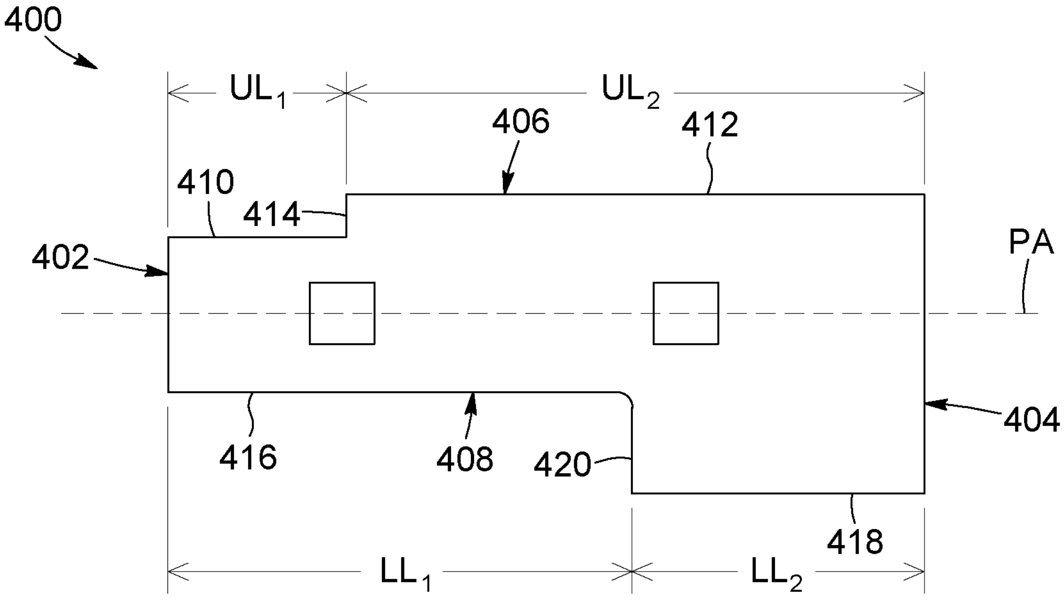
FIG. 10 is a front elevation view of a wear pad for a rotor arm of the lower rotor illustrated in FIG. 5, in accordance with yet another embodiment.

Turning to FIG. 10, there is shown a wear pad 400, in accordance with another embodiment. In this embodiment, the wear pad 400 is generally elongated and extends along a central pad axis PA. The wear pad 400 includes inner and outer pad ends 402, 404 and upper and lower edges 406, 408 extending between the inner and outer pad ends 402, 404.

In the embodiment illustrated in FIG. 10, the upper edge 406 includes a first upper edge segment 410 located towards the inner pad end 302 and a second upper edge segment 412 located towards the outer pad end 404. The first and second edge segments 410, 412 are substantially parallel to each other and to the central pad axis PA but are spaced from the central pad axis PA by different distances. Specifically, the first upper edge segment 410 is spaced from the central pad axis PA by a first upper segment distance and the second edge segment 412 is spaced from the central pad axis PA by a second upper segment distance greater than the first upper segment distance. The first and second upper edge segments 410, 412 are further connected to each other by a third upper edge segment 414 which extends substantially perpendicularly to the first and second upper edge segments 410, 412. In the illustrated embodiment, the first upper edge segment 410 further has a first upper segment length $UL_1$ and the second upper edge segment 412 has a second upper segment length $UL_2$ which is greater than the first upper segment length $UL_1$.

Still in this embodiment, the lower edge 408 includes a first lower edge segment 416 located towards the inner pad end 302 and a second lower edge segment 418 located towards the outer pad end 304. The first and lower edge segments 416, 418 extend substantially parallel to each other and to the central pad axis PA. Similarly to the first and second upper edge segments 410, 412, the first and second lower edge segments 416, 418 are not aligned with each other but are instead spaced from the central pad axis PA by different distances. Specifically, the first lower edge segment 416 is spaced from the central pad axis PA by a first lower segment distance and the second lower edge segment 418 is spaced from the central pad axis PA by a second lower segment distance which is greater than the first distance. In the illustrated embodiment, the wear pad 400 is asymmetrical about the central pad axis PA. Specifically, while the first lower segment distance is substantially similar to the first upper segment distance, the second lower segment distance is substantially greater than the second upper edge distance. The first and second lower edge segments 416, 418 are further connected together by a third lower edge segment 420 which extends substantially perpendicularly to the first and second lower edge segments 416, 418.

In one embodiment, the lower rotor assembly 108*c* is positioned towards the bottom end 22 of the housing 20, but at least slightly vertically higher than the housing floor 29 such that the rotor arms 122 of the lower rotor assembly 108*c* are spaced upwardly from the housing floor 29. In this embodiment, the wear pad 400 may be shaped such that the second lower segment distance is substantially equal to the distance between the central pad axis PA and the housing floor 29 to close the gap between the wear pad 400 and the housing floor 29. In this embodiment, the second lower edge segment 418 can therefore be slightly spaced from the housing floor 29 but almost contact the housing floor 29.

In the embodiment illustrated in FIG. 10, the first lower edge segment 416 further has a first lower segment length $LL_1$ and the second lower edge segment 418 has a second lower segment length $LL_2$. In this case, the first lower segment length $LL_1$ is greater than the second lower segment length $LL_2$. Moreover, the second upper segment length $UL_2$ is substantially greater than the second lower segment length $LL_2$.

Figure 11:
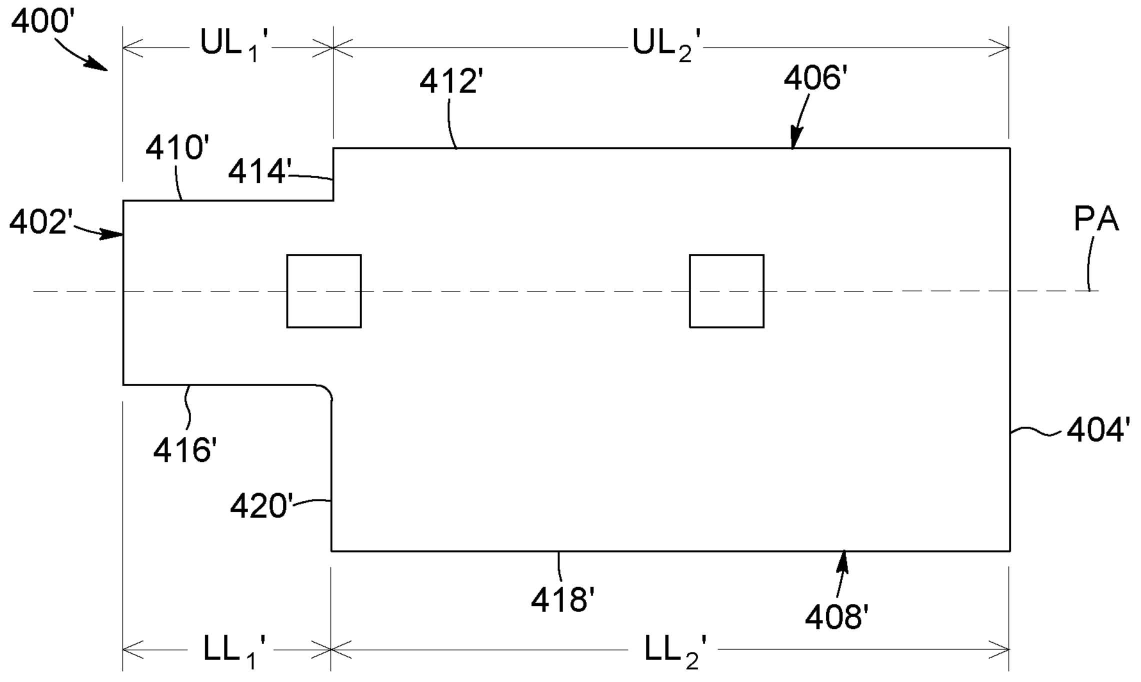
FIG. 11 is a front elevation view of a wear pad for a rotor arm of the lower rotor illustrated in FIG. 5, in accordance with still another embodiment.

Referring now to FIG. 11, there is shown a wear pad 400', in accordance with another embodiment. In this embodiment, the wear pad 400' is generally elongated and extends along a central pad axis PA. The wear pad 400' includes inner and outer pad ends 402', 404' and upper and lower edges 406', 408' extending between the inner and outer pad ends 402', 404'. The upper edge 406' includes first and second upper edge segments 410', 412' and the lower edge 408' includes first and second lower edge segments 416', 418'. The first upper edge segment 410' is spaced from the central pad axis PA by a first upper segment distance and the second upper edge segment 412' is spaced from the central pad axis PA by a second upper segment distance which is greater than the first upper segment distance. The first and second upper edge segments 410', 412' are further connected together by a third upper edge segment 414' extending substantially perpendicularly to the first and second upper edge segments 410', 412'.

The first lower edge segment 416' is further spaced from the central pad axis PA by a first lower segment distance and the second lower edge segment 418' is spaced from the central pad axis PA by a second lower segment distance which is substantially greater than the first lower segment distance. Specifically, the second lower segment distance is substantially greater than the second upper segment distance such that the wear pad 400' is asymmetrical about the central pad axis PA. In the illustrated embodiment, the second lower segment distance of the wear pad 400' is further substantially greater than the second lower segment distance of the wear pad 400 illustrated in FIG. 10. The first and second lower edge segments 416', 418' are further connected together by a third lower edge segment 420' extending substantially perpendicularly to the first and second lower edge segments 416', 418'.

Similarly to the wear pad 400 illustrated in FIG. 10, the first upper edge segment 410' has a first upper segment length $UL_1'$, the second upper edge segment 412' has a second upper segment length $UL_2'$, the first lower edge segment 416' has a first lower segment length $LL_1'$ and the second lower edge segment 418' has a second lower segment length $LL_2'$. In the embodiment illustrated in FIG. 11, the first upper segment length $UL_1'$ and the first lower segment length $LL_1'$ are substantially equal to each other, and the second upper segment length $UL_2'$ and the second lower segment length $LL_2'$ are substantially equal to each other. The third upper edge segment 414' and the third upper edge segment 420' are therefore substantially aligned with each other. The second upper segment length $UL_2'$ and the second lower segment length $LL_2'$ are further substantially greater than the first upper segment length $UL_1'$ and the first lower segment length $LL_1'$.

It will be understood that the above configurations of the wear pads 400, 400' are provided merely as an example and that various other configurations may be considered.

Figure 12:
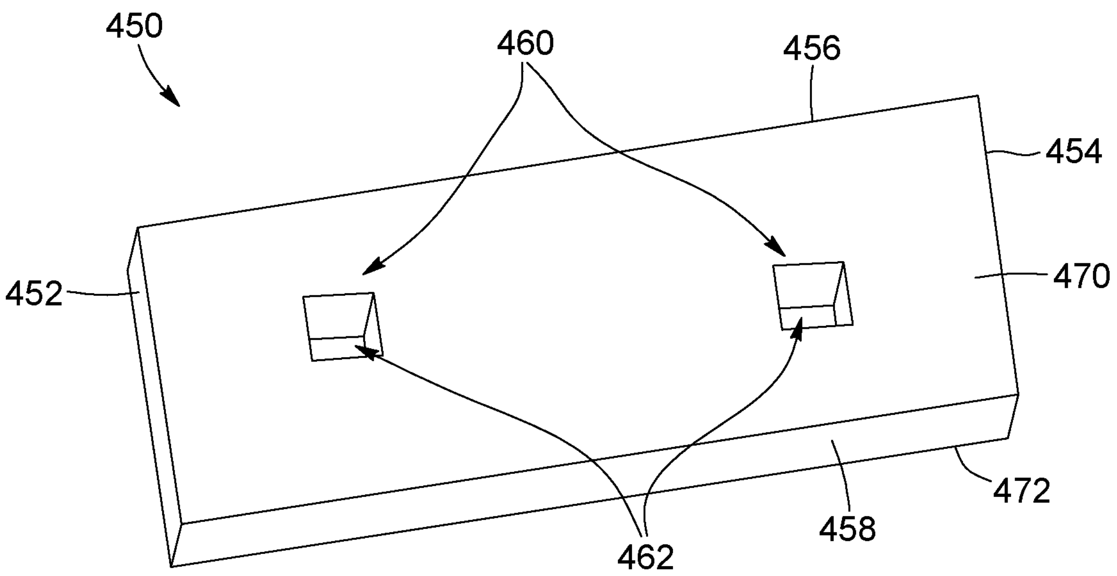
FIG. 12 is a perspective view of a wear pad for a rotor arm for the pulverizer illustrated in FIG. 1, in accordance with one embodiment.
Figure 13:
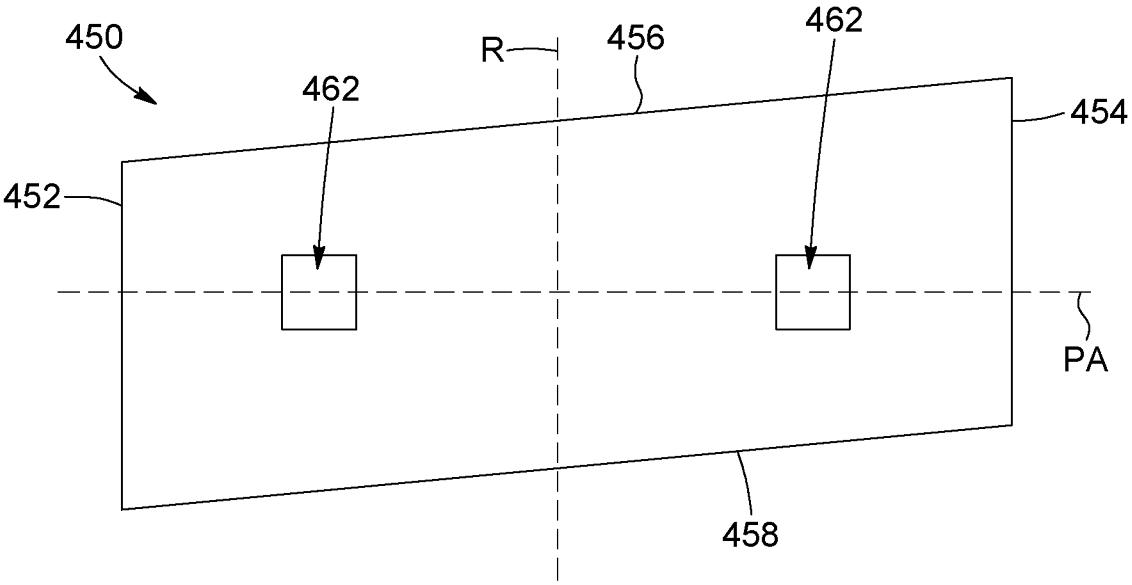
FIG. 13 is a front elevation view of the wear pad illustrated in FIG. 12.

Referring now to FIGS. 12 and 13, there is shown a wear pad 450, in accordance with another embodiment. In this embodiment, the wear pad 450 is generally elongated and extends along a central pad axis PA. The wear pad 450 includes inner and outer pad ends 452, 454 and upper and lower edges 456, 458 extending between the inner and outer pad ends 452, 454. In this embodiment, the upper and lower edges 456, 458 each include a single continuous and straight segment extending between the inner and outer pad ends 452, 454. In this embodiment, the wear pad 450 includes an arm connector 460 cooperable with a corresponding pad connector of the rotor arm 122 to secure the wear pad 450 to the arm 122. Specifically, the arm connector 460 includes a pair of fastener-receiving openings 462 which are spaced from each other and are both disposed on the central pad axis PA.

Still in this embodiment, the upper and lower edges 456, 458 extend substantially parallel to each other. However, the upper and lower edges 456, 458 do not extend parallel to the central pad axis PA but are instead angled relative to the central pad axis PA, such that the wear pad 450 is substantially parallelogram-shaped.

In one embodiment, the upper edge 456 extends away from the central pad axis PA as it extends from the inner pad end 452 to the outer pad end 454, and the lower edge 458 extends towards the central pad axis PA as it extends from the inner pad end 452 to the outer pad end 454. Alternatively, the upper edge 456 could instead extend towards the central pad axis PA and the lower edge 458 could extend away from the central pad axis PA as they extend from the inner pad end 452 to the outer pad end 454.

As shown in FIG. 12, in the illustrated embodiment, the wear pad 450 is substantially flat and includes front and rear planar faces 470, 472 that extend substantially parallel to each other. Alternatively, the front and rear planar faces 470, 472 could instead be angled relative to each other, or the front and rear planar faces 470, 472 could instead not be planar and could instead have any other suitable configuration.

In one embodiment, the wear pad 450 is further reversible, either to extend its life or to change one or more parameters of the output flow. In other words, the wear pad 450 could be secured to the corresponding rotor arm 122 in a first orientation, unsecured from the corresponding rotor arm 122 and secured again to the corresponding rotor arm 122 in a second orientation different from the first orientation. For example, the wear pad 450 could be reversed about the central pad axis PA such that the lower edge 458 extend above the upper edge 456, or reversed about an axis R perpendicular to the central pad axis PA such that the inner and outer pad ends 452, 454 are interchanged. The wear pad 450 could also be fully reversed by flipping it both about the central pad axis PA and the axis R.

Discharge Portion Configuration

The output flow could also be controlled by configuring the discharge portion 160 of the housing 20 in an appropriate configuration. In some embodiments, the discharge portion 160 or at least part of the discharge portion 160 could further be reconfigurable in one of multiple configurations, each configuration providing the output flow with one or more desired characteristics.

Referring back to FIG. 4, the discharge portion sidewall 162 includes a penannular wall portion 170 defining the circular chamber portion 166 and a conduit portion 172 defining the discharge conduit 168. Specifically, the penannular wall portion 170 includes a first penannular wall end 174, a second penannular wall end 176 and a curved wall 178 extending therebetween. The conduit portion 172 includes outer and inner planar walls 180, 182 extending parallel to each other. The outer planar wall 180 extends from the first penannular wall end 174 and the inner planar wall 182 extending from the second penannular wall end 176. While the outer planar wall 180 meets the curved wall 178 and forms a substantially smooth transition therewith, the inner planar wall 182 may meet the curved wall 178 at a substantially sharp angle forming an apex 184 of the discharge portion sidewall 162, located adjacent the discharge conduit 168.

It has been observed that a so-called “dead zone” in the output flow may be created on or around the apex 184, which causes pulverized material to remain stuck on the apex 184 and/or on the curved wall 178 near the apex 184 instead of being properly discharged through the discharge conduit 168. By modifying the configuration of the apex 184, this dead zone may be reduced or even eliminated to thereby minimize the amount of pulverized material accumulating on the interior of the discharge portion sidewall 162, on the walls 172, 180 and/or on the floor 32.

Figure 14:
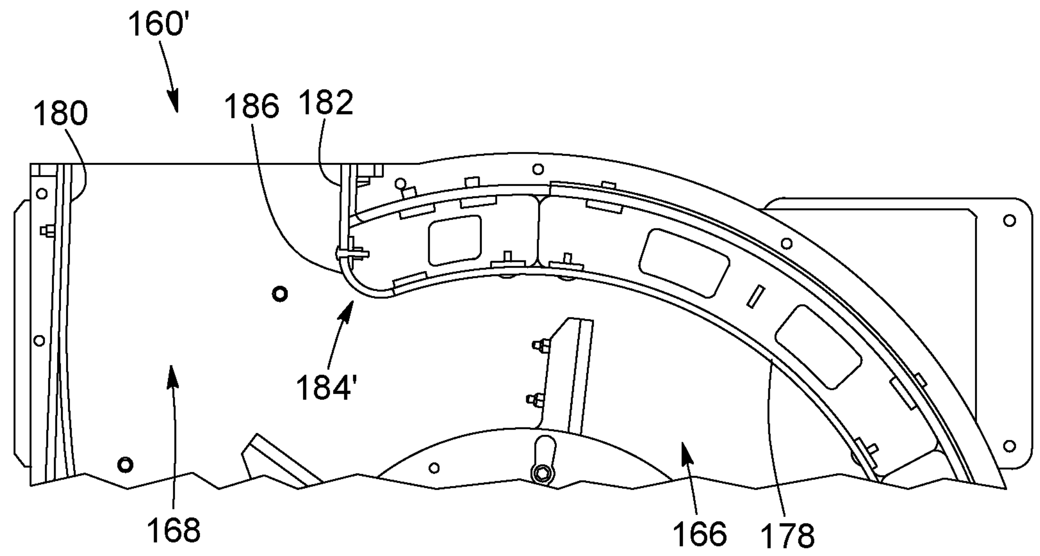
FIG. 14 is a portion of a transversal cross-section view of a pulverizer, in accordance with another embodiment, showing a curved apex.
Figure 15:
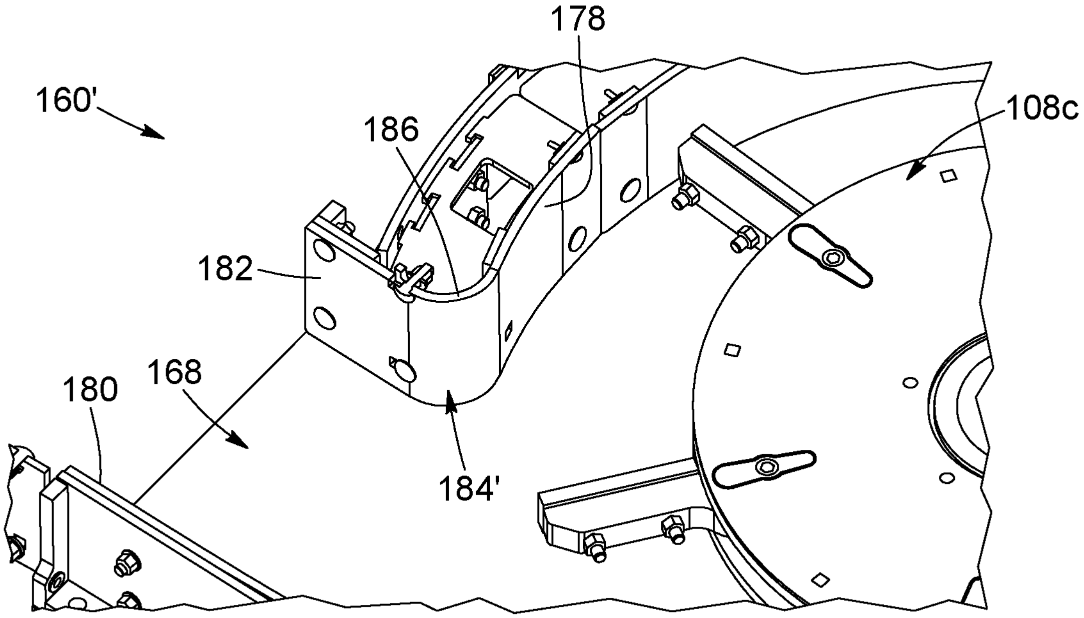
FIG. 15 is a perspective view of the portion of the transversal cross-section view of the pulverizer illustrated on FIG. 14.

Referring now to FIGS. 14 and 15, there is shown a discharge portion 160', in accordance with one embodiment. In this embodiment, the discharge portion 160' includes the outer and inner planar walls 180, 182 defining the discharge conduit 168 and the curved wall 178 defining the circular chamber portion 166. The inner planar wall 182 meets the curved wall 178 to form an apex 184'. In this embodiment, the apex 184' is curved, and more specifically convexly curved, instead of forming a substantially sharp angle. It has been observed that providing a convexly curved apex reduces the amount of pulverized material that accumulates on the interior of the discharge portion sidewall 162.

In the illustrated embodiment, the apex 184' is formed by a curved apex plate 186 which extends between the curved wall 178 and the inner planar wall 182 and which creates a smooth, substantially continuous transition between curved wall 178 and the inner planar wall 182. Alternatively, the apex 184' could be formed using any other suitable configuration.

Figure 16:
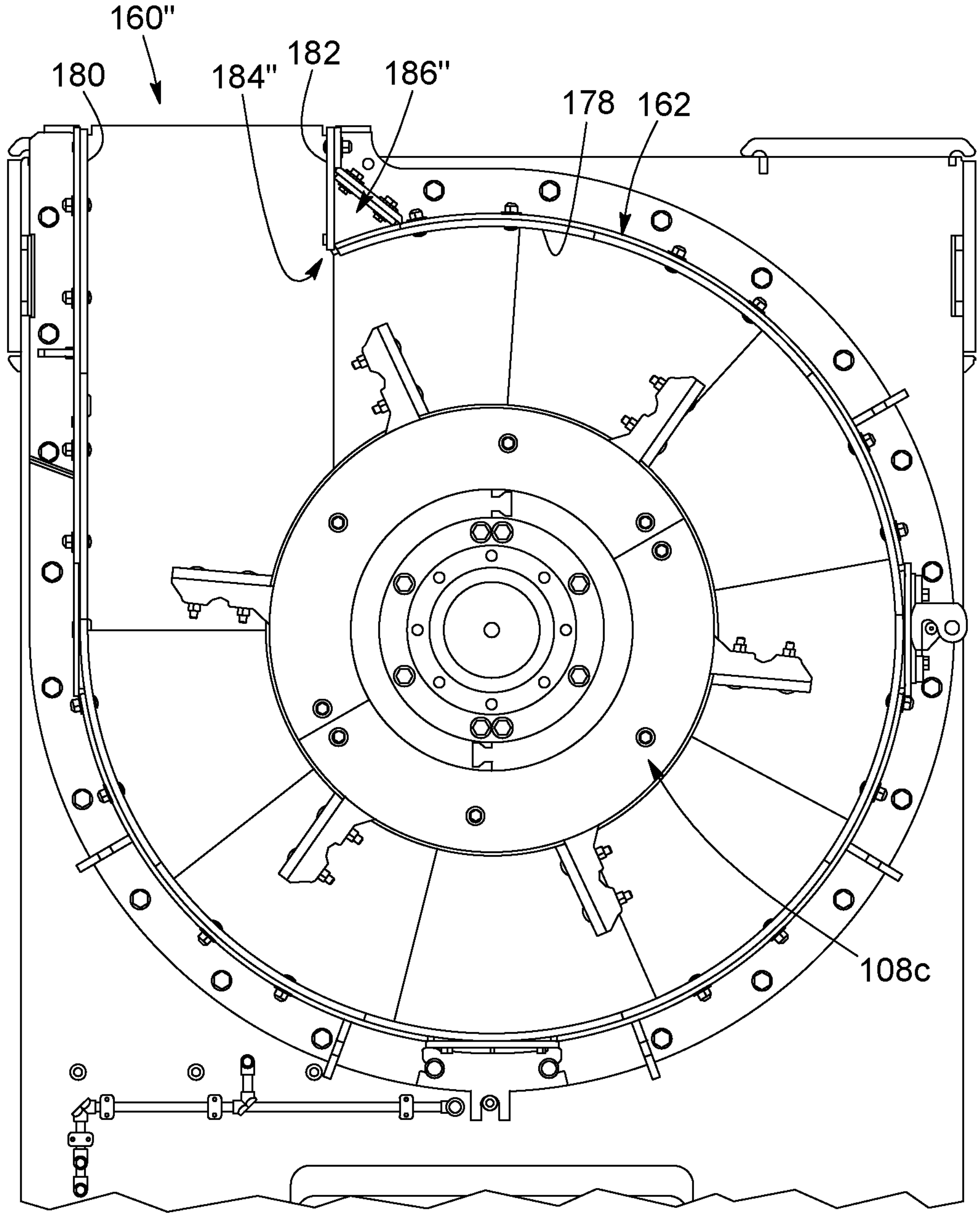
FIG. 16 is a transversal cross-section view of the pulverizer illustrated in FIG. 1, in accordance with another embodiment in which the apex includes an apex plate which is removable.

FIG. 16 shows a discharge portion 160", in accordance with another embodiment. In this embodiment, the discharge portion 160" includes an apex 184" formed by an apex plate 186" which is removable from the discharge portion sidewall 162. In one embodiment, the pulverizer 10 could be provided with one or more additional apex plates which are sized and shaped differently from the apex plate 186" (e.g. convexly curved at different radiuses, planar but slanted at different angles, etc.) and which could be interchanged with the apex plate 186" to provide other characteristics to the output flow.

Figure 17:
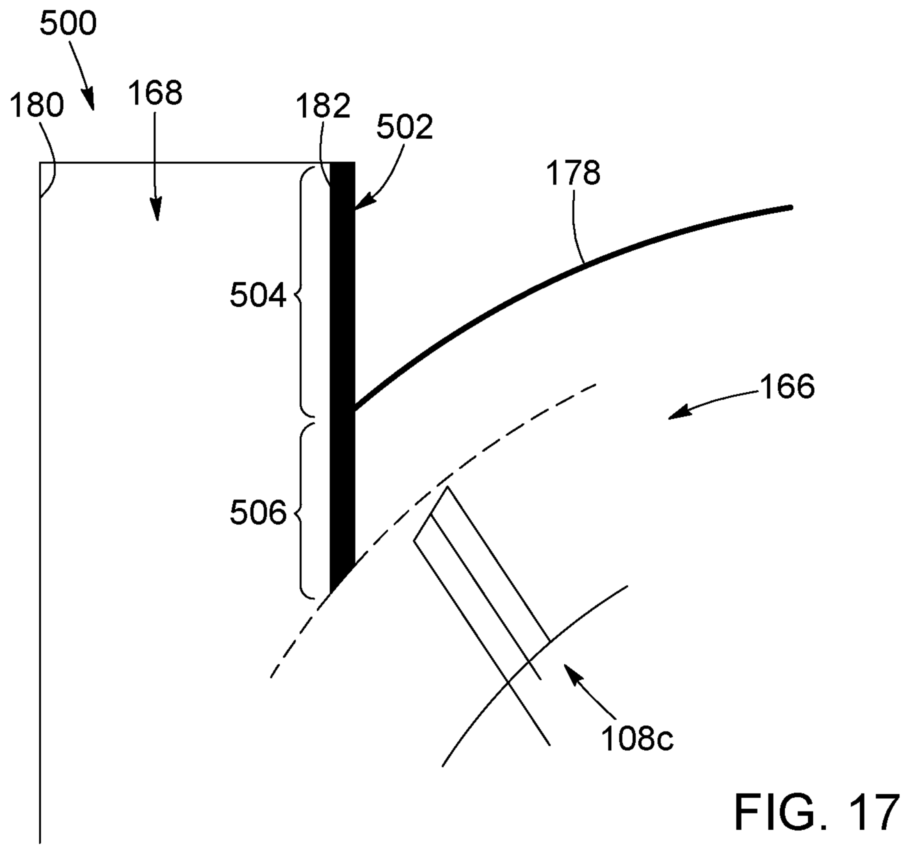
FIG. 17 is a schematic drawing showing a transversal cross-section view of a pulverizer in accordance with another embodiment in which the apex is defined by an apex extension plate.
Figure 18:
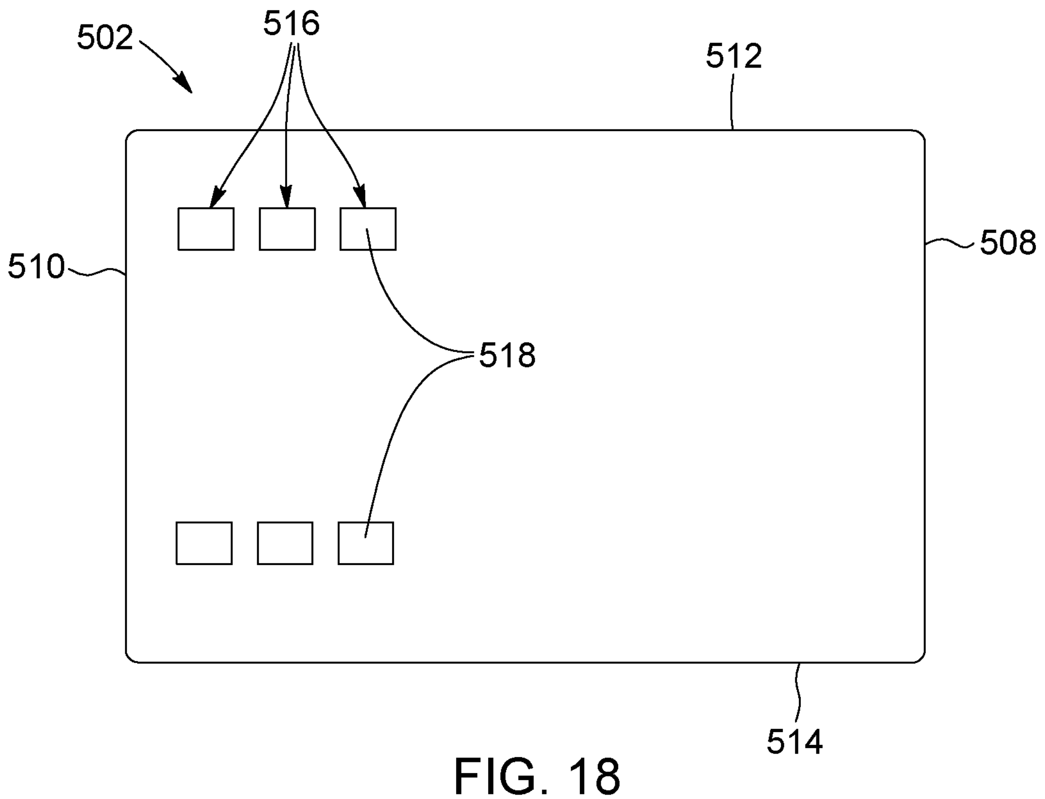
FIG. 18 is a front elevation view of the apex extension plate illustrated in FIG. 17.

Turning to FIGS. 17 and 18, there is shown a discharge portion 500, in accordance with another embodiment. In this embodiment, the discharge portion 500 includes the outer and inner planar walls 180, 182 defining the discharge conduit 168 and the curved wall 178 defining the circular chamber portion 166. In this embodiment, the discharge portion 500 further includes an apex extension plate 502 which extends substantially parallel to the inner planar wall 182 and which is secured to the inner planar wall 182. The apex extension plate 502 has a first plate end portion 504 which extends along the inner planar wall 182 and a second plate end portion 506, located opposite the first plate end portion 504, which extends beyond the curved wall 178. In the embodiment illustrated in FIGS. 17 and 18, the apex extension plate 502 is substantially rectangular and includes an inner plate edge 508, an outer plate edge 510 and top and bottom plate edges 512, 514 extending between the inner and outer plate edges 508, 510. In this embodiment, the inner plate edge 508 is substantially linear and extends substantially parallel to the outer plate edge 510, while the top and bottom plate edges 512, 514 extend substantially parallel to each other and substantially perpendicular to the inner and outer plate edges 508, 510.

When the apex extension plate 502 is secured to the inner planar wall 182, the inner plate edge 508 is located towards the lower rotor assembly **108*c* and extends substantially vertically and substantially perpendicular to the housing floor 29, while the bottom plate edge 514 extends along the housing floor 29. In this configuration, the inner plate edge 508 defines an apex 516 of the discharge portion 500**.

The apex extension plate 502 further includes a plurality of plate connectors 516 for connecting the apex extension plate 502 to the inner planar wall 182. Specifically, in the illustrated embodiment, each plate connector 516 includes a pair of plate connection openings 518 for receiving fasteners. The connection openings 518 can be placed in alignment with corresponding connection openings on the inner planar wall 182 and the fasteners can be inserted into the connections opening 518 of the apex extension plate 502 and of the inner planar wall 182 to thereby secure the apex extension plate 502 to the inner planar wall 182.

In the illustrated embodiment, the connectors 516 are spaced from each other in a longitudinal direction relative to the apex extension plate 502. Each connector corresponds to a position of the apex extension plate 502 relative to the inner planar wall 182. This allows the distance between the inner plate edge 508 and the lower rotor assembly **18*c* to be adjusted by connecting the apex extension plate 502 via a corresponding one of the plate connectors 516. Alternatively, the apex extension plate 502 may not include multiple connectors 516** and/or may not be movable.

Figure 19:
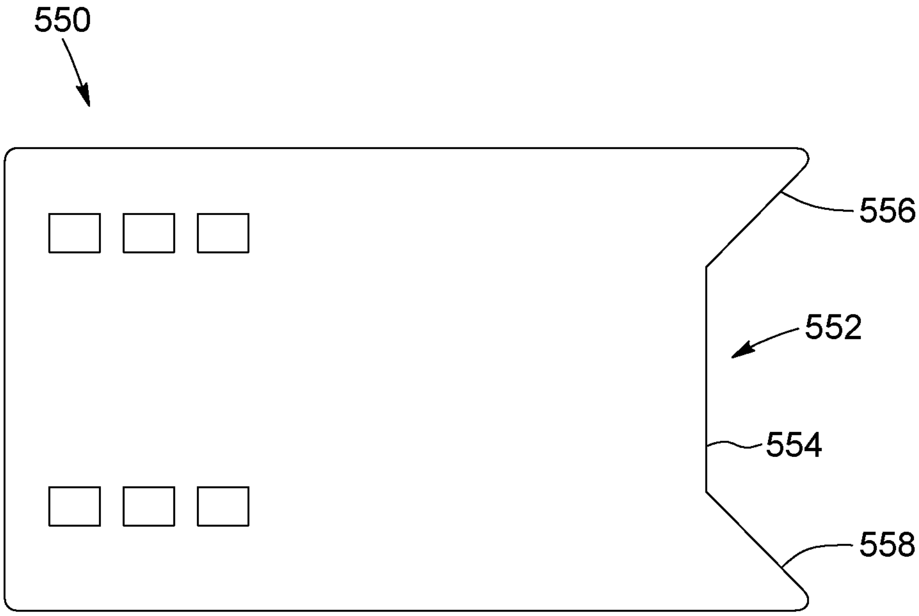
FIG. 19 is a front elevation view of an apex extension plate for a pulverizer, in accordance with another embodiment.

FIG. 19 shows an apex extension plate 550 in accordance with another embodiment. In this embodiment, the apex extension plate 550 includes an inner plate edge 552 which is not fully straight, but instead includes a central vertical segment 554, an upper angled segment 556 extending upwardly and forwardly from the central straight portion 554 and a lower angled segment 558 extending downwardly and forwardly from the central straight portion 554.

Figure 20:
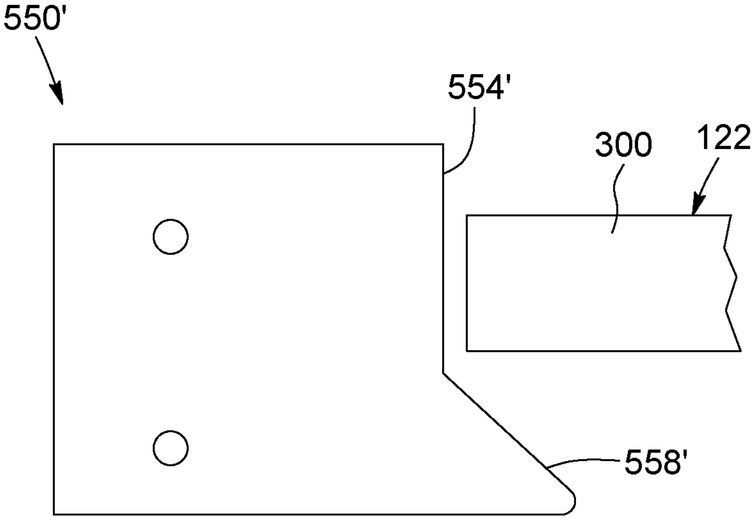
FIG. 20 is a front elevation view of an apex extension plate for a pulverizer, in accordance with yet another embodiment.

FIG. 20 shows an apex extension plate 550', in accordance with yet another embodiment. In this embodiment, the apex extension plate 550 includes an inner plate edge 552' which has an upper vertical segment 554' and a lower angled segment 558'.

Both the plates 550 and 550' are configured such that when secured to the inner planar wall 182, the rotors arms 122 and wear pads 300 are horizontally aligned with a respective one of the central vertical segment 554 and the upper vertical segment 554' and the lower angled segment 558, 558' extends below the rotors arms 122 and wear pads 300.

Figure 21:
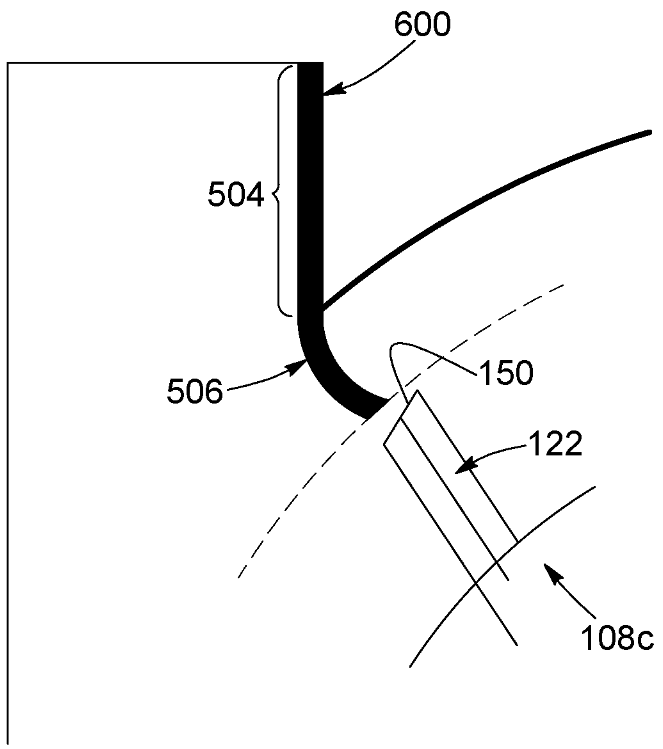
FIG. 21 is a transversal cross-section view of a pulverizer in accordance with another embodiment in which the apex extension plate is curved away from a discharge conduit of the pulverizer.
Figure 22:
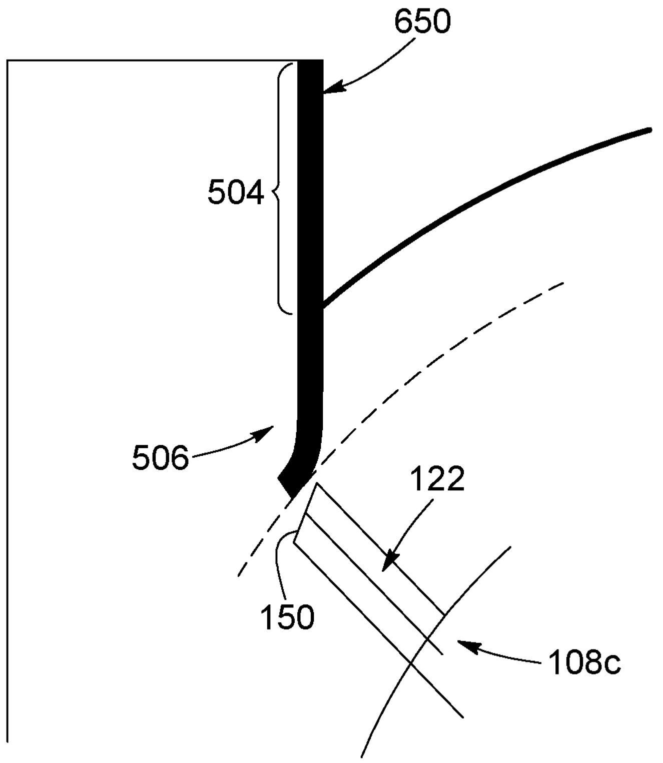
FIG. 22 is a transversal cross-section view of a pulverizer in accordance with another embodiment in which the apex extension plate is curved towards a discharge conduit of the pulverizer.

Referring now to FIGS. 21 and 22, the apex extension plate may not be fully planar. More specifically, FIG. 21 shows an apex extension plate 600 which is substantially curved away from the discharge conduit 168 while FIG. 22 shows an apex extension plate 650 which is substantially curved towards the discharge conduit 168. Specifically, the first plate end portion 504 of the plates 600, 650 is still planar, while the second plate end portion 506 of the plates 600, 650, which extends beyond the curved wall 178, is curved. These configurations may further contribute to reduce the accumulation of pulverized material on the interior of the discharge portion sidewall 162.

Flow Guiding Members(s)

Additional features and elements could also be provided within the housing 20 to allow the shape of the output flow to be adjusted. The additional features and elements could be provided alone or in combination with any of the features related to the lower rotor assembly, to the configuration of the wear pads and/or to the configuration of the discharge portion 160 as described above.

Figure 23:
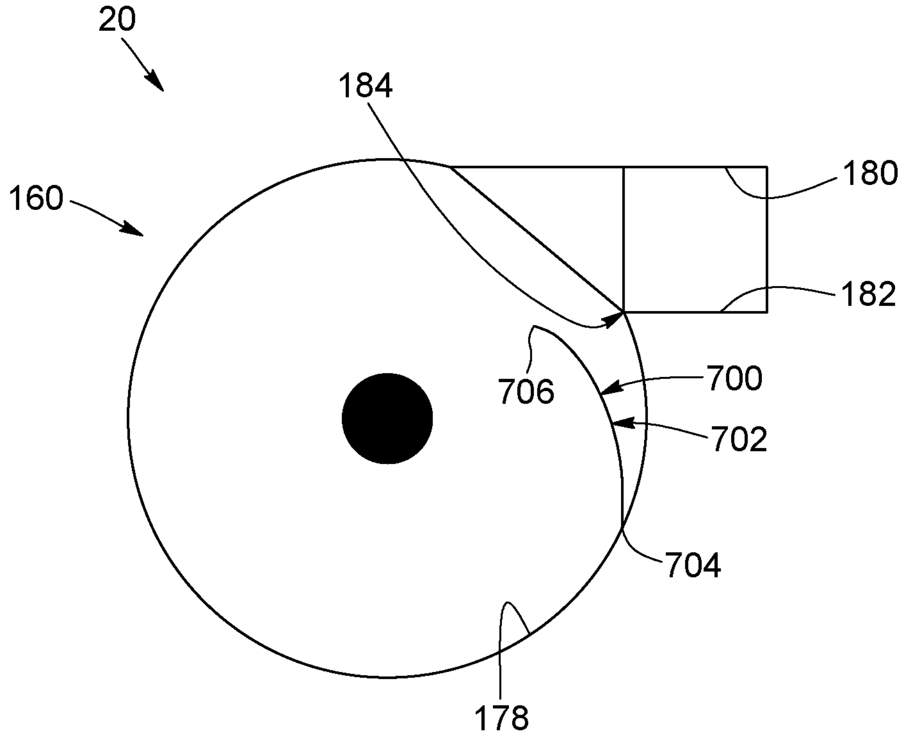
FIG. 23 is a transversal cross-section view of a pulverizer in accordance with another embodiment in which the housing of the pulverizer includes a flow deviation plate disposed in the discharge portion of the housing.

Referring to FIG. 23, in one embodiment, the housing 20 further includes a flow guiding member 700 disposed in the discharge portion 160 to provide a desired shape of the output flow. Specifically, the flow guiding member 700 includes a flow deviation plate 702 which is secured to the penannular wall portion 170. In the illustrated embodiment, the flow deviation plate 702 is substantially curved and extends between a first deviation plate end 704 and a second deviation plate end 706. The first deviation plate end 704 is connected to the penannular wall portion 170 and the flow deviation plate 702 extends along the penannular wall portion 170 towards the apex 184 while deviating increasingly towards the center of the circular chamber portion 166. The second deviation plate end 706 is located further towards the discharge conduit 168, beyond the apex 184, such that the flow deviation plate 702 extends between the apex 184 and the lower rotor assembly 108*c* to direct the output flow away from the apex 184.

In another embodiment, the flow deviation plate 702 could be substantially longer and the first deviation plate end 704 could be positioned further away from the discharge conduit 168 to allow the flow deviation plate 702 to guide the output flow along a longer deviation path away from the apex 184.

In other embodiments, the housing 20 could include multiple flow deviation plates substantially similar to the flow deviation plate 702, which could be disposed at predetermined locations inside the discharge portion 160 to further guide the output flow along a desired path inside the discharge portion 160. In yet another embodiment, the flow deviation plate 702 may not be curved but could instead be planar or have any other suitable shape, size or configuration. In yet another embodiment, the flow guiding member 700 may not include a plate and could instead be configured according to any other suitable configuration.

It will be understood that the pulverizer could include any combination of two or more of the features described above to control one or more parameters of the output flow, such as the shape and the flowrate of the output flow.

By allowing the control of the output flow and/or the adjustment of one or more parameters of the output flow, the above features reduce the amount of pulverized material which remains stuck to the interior of the discharge portion 160, the walls 172, 180 and/or the floor 32 of the housing 20. This reduces the costs and labor associated with the maintenance of the pulverizer and ensures that the pulverizer 10 operates optimally.

These features further increase the amount of pulverized material that is expelled through the outlet and can be further treated and/or repurposed, thereby increasing the overall yield of the pulverizer by reducing or eliminating waste.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A pulverizer comprising:

a housing having top and bottom ends, the housing further having an inlet located towards the top end for receiving input material to pulverize and an outlet located towards the bottom end for discharging pulverized material from the housing, the housing including a housing sidewall extending between the top and bottom ends and defining an interior chamber, the housing having a central housing axis;

a rotatable shaft extending between the top end and the bottom end of the housing along the central housing axis;

a plurality of rotor hub assemblies mounted to the shaft, each rotor hub assembly including a rotor hub and a plurality of rotor arms extending outwardly from the rotor hub towards the housing sidewall for forming an airflow revolving about the central housing axis within the interior chamber when the rotatable shaft is rotated, wherein at least one of the housing and of one or more of the rotor hub assemblies is selectively reconfigurable between a plurality of configurations to adjust at least one parameter of an output flow of the pulverized material at the outlet, wherein the housing includes a discharge portion located at the bottom end thereof, the discharge portion including a discharge portion sidewall defining a discharge chamber portion of the interior chamber, the discharge chamber including a circular chamber portion extending substantially concentrically around the shaft and a discharge conduit extending substantially tangentially to the circular portion to discharge pulverized material from the circular portion, the discharge chamber being configured so as to provide a predetermined shape of the output flow.

2. The pulverizer as claimed in claim 1, wherein the at least one parameter includes at least one of a flowrate of the output flow and a shape of the output flow.

3. The pulverizer as claimed in claim 1, wherein the plurality of rotor assemblies includes a lower rotor assembly located proximal the outlet, the lower rotor assembly being reconfigurable between the plurality of configurations, and wherein the rotor arms of the lower rotor assembly are selectively movable between a first position defining a first outer diameter of the lower rotor assembly and a second position defining a second outer diameter of the lower rotor assembly different from the first outer diameter.

4. The pulverizer as claimed in claim 3, wherein each arm includes an arm body and a wear pad connectable to the arm body wherein the arm is substantially spaced upwardly from a housing floor and wherein the wear pad is sized and shaped to extend downwardly from the arm and substantially to the housing floor wherein each wear pad is asymmetrical, and wherein each wear pad extends along a central pad axis and has upper and lower pad edges extending substantially parallel to the central pad axis, the upper pad edge being spaced from the central pad axis from a first distance and the lower pad edge being spaced from the central pad axis from a second distance greater than the first distance.

5. The pulverizer as claimed in claim 1, wherein the discharge portion sidewall includes a penannular wall portion defining the circular chamber portion and a conduit portion defining the discharge conduit.

6. The pulverizer as claimed in claim 5, wherein the penannular wall portion and the conduit portion meet at an apex extending towards the shaft, the apex being configured to provide the predetermined shape of the output flow.

7. The pulverizer as claimed in claim 6, wherein the apex includes an apex plate that is removable from the discharge portion sidewall.

8. The pulverizer as claimed in 7, further comprising at least one additional apex plate sized and shaped differently from the apex plate, the at least one additional apex plate being interchangeable with the apex plate to provide another predetermined shape to the output flow.

9. The pulverizer as claimed in claim 5, further comprising an apex extension plate connected to a sidewall of the discharge conduit and extending beyond the penannular wall portion and into the discharge chamber to form an apex of the discharge portion within the discharge chamber.

10. The pulverizer as claimed in claim 9, wherein the apex extension plate has a first plate end portion spaced from a straight portion of the discharge portion sidewall to form the discharge conduit and a second plate end portion opposite the first end portion extending beyond the penannular wall portion, the second plate end portion including an inner plate edge.

11. The pulverizer as claimed in claim 10, wherein:

the inner plate edge is substantially entirely straight; or the inner plate edge includes a vertical segment and a lower angled segment extending forwardly and downwardly from the vertical segment.

12. The pulverizer as claimed in claim 9, wherein the apex extension plate is selectively movable towards and away from the rotatable shaft.

13. The pulverizer as claimed in claim 12, wherein the apex extension plate includes a plurality of plate fastening openings for receiving plate connecting fasteners, the plurality of plate fastening openings including a plurality of plate fastening opening sets, each plate fastening opening set allowing the apex extension plate to extend into the discharge chamber by a predetermined distance.

14. The pulverizer as claimed in claim 13, wherein at least one of:

each fastening opening set includes two fastener openings aligned substantially vertically with each other; and the plurality of plate fastening openings sets includes at least three plate fastening openings sets.

15. The pulverizer as claimed in claim 11, wherein the second plate end portion is substantially planar; or the second plate end portion is substantially curved.

16. The pulverizer as claimed in claim 15, wherein one of:

the first plate end portion is substantially planar and extends in a first plate portion plane, the second plate end curving away from the first plate portion plane;

the second plate end portion is substantially curved away from the discharge conduit; and the second plate end portion is substantially curved towards the discharge conduit.

17. The pulverizer as claimed in claim 5, wherein the housing further includes a flow deviation plate extending away from the discharge portion sidewall and between the rotor hub assemblies and the apex to direct the output flow away from the apex.

* * * * *